(12) United States Patent
Kuwahara et al.

(10) Patent No.: US 8,224,879 B2
(45) Date of Patent: Jul. 17, 2012

(54) MANAGEMENT SYSTEM AND MANAGEMENT METHOD FOR STORAGE SYSTEM

(75) Inventors: Hiroshi Kuwahara, Odawara (JP); Nobuyuki Saika, Yokosuka (JP)

(73) Assignee: Hitachi, Ltd., Tokyo (JP)

( * ) Notice: Subject to any disclaimer, the term of this patent is extended or adjusted under 35 U.S.C. 154(b) by 197 days.

(21) Appl. No.: 12/678,960

(22) PCT Filed: Feb. 23, 2010

(86) PCT No.: PCT/JP2010/001195
§ 371 (c)(1),
(2), (4) Date: Mar. 18, 2010

(87) PCT Pub. No.: WO2011/104743
PCT Pub. Date: Sep. 1, 2011

(65) Prior Publication Data
US 2011/0264716 A1    Oct. 27, 2011

(51) Int. Cl.
*G06F 17/30* (2006.01)
(52) U.S. Cl. ....................................... 707/827
(58) Field of Classification Search ............ 707/827
See application file for complete search history.

(56) References Cited

U.S. PATENT DOCUMENTS

| | | | | |
|---|---|---|---|---|
| 6,216,015 B1* | 4/2001 | Hymel | ............ | 455/558 |
| 7,809,774 B2* | 10/2010 | Tichy et al. | ............ | 707/822 |
| 7,865,485 B2* | 1/2011 | Mullick et al. | ............ | 707/704 |
| 7,937,421 B2* | 5/2011 | Mikesell et al. | ............ | 707/825 |
| 8,073,881 B1* | 12/2011 | Georgiev | ............ | 707/812 |
| 2002/0120607 A1* | 8/2002 | Price et al. | ............ | 707/1 |
| 2004/0243630 A1 | 12/2004 | Kanie | | |
| 2006/0090049 A1 | 4/2006 | Saika | | |
| 2007/0234115 A1 | 10/2007 | Saika | | |
| 2008/0052514 A1* | 2/2008 | Nakae | ............ | 713/168 |
| 2010/0132022 A1* | 5/2010 | Venkatasubramanian | ........ | 726/7 |
| 2010/0250497 A1* | 9/2010 | Redlich et al. | ............ | 707/661 |

FOREIGN PATENT DOCUMENTS

JP   2004-234556   8/2004

OTHER PUBLICATIONS

International Search Report in International Application No. PCT/JP2010/001195 mailed Sep. 21, 2010.
Written Opinion of the International Searching Authority in International Application No. PCT/JP2010/001195 mailed Sep. 21, 2010.

* cited by examiner

*Primary Examiner* — Sheree Brown
(74) *Attorney, Agent, or Firm* — Brundidge & Stanger, P.C.

(57) ABSTRACT

In a management system for a storage system including plural file sharing environments, a maintenance interval calculating part calculates a time interval average for operation commands given to the file sharing environments; a management difficulty calculating part calculates an index showing difficulty of managing the file sharing environment; a usage degree calculating part calculates an index showing a usage degree of each of the file sharing environments; a processing content keeping part keeps numerical ranges for the average maintenance interval, the management difficulty, and the file sharing environment usage degree in association with processing contents for the maintenance interval calculating part, the management difficulty calculating part, and the usage degree calculating part; a storing area stores each of the file sharing environments and the processing contents in association with each other; and a processing content executing part executes the processing contents for each of the file sharing environments.

13 Claims, 28 Drawing Sheets

[Fig. 1]
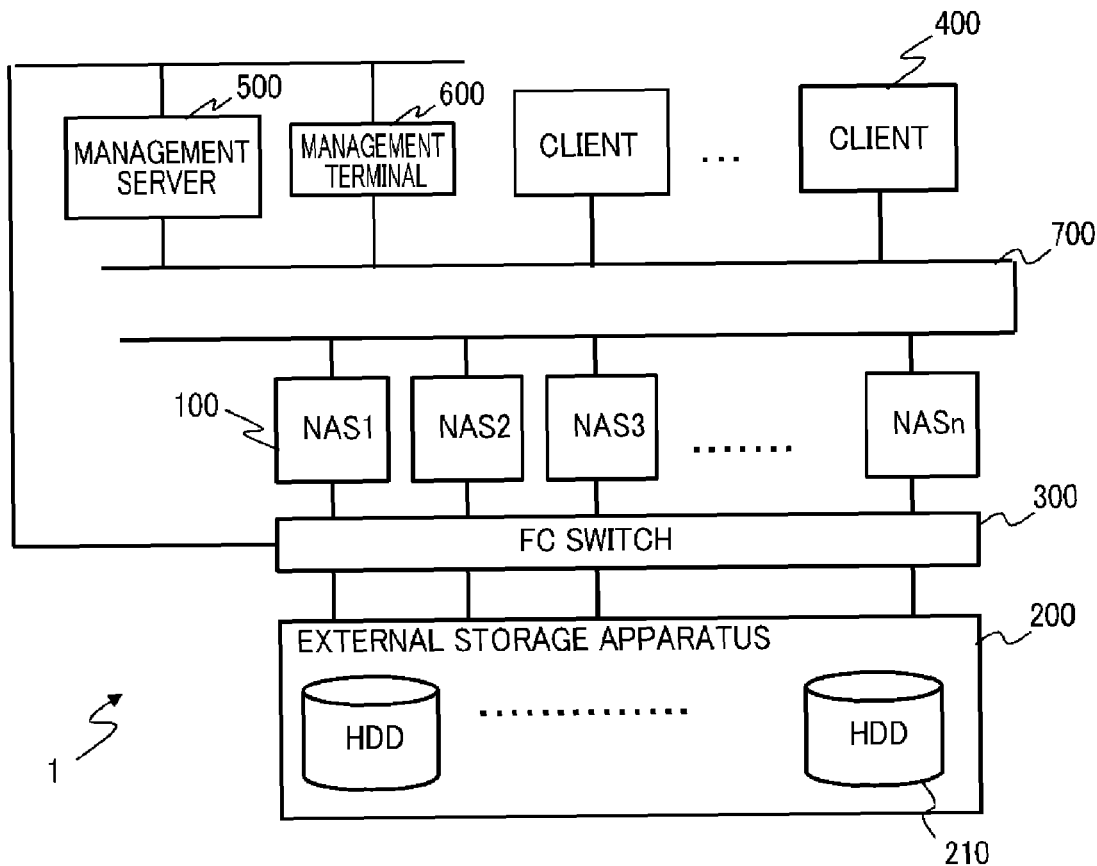
[Fig. 2]
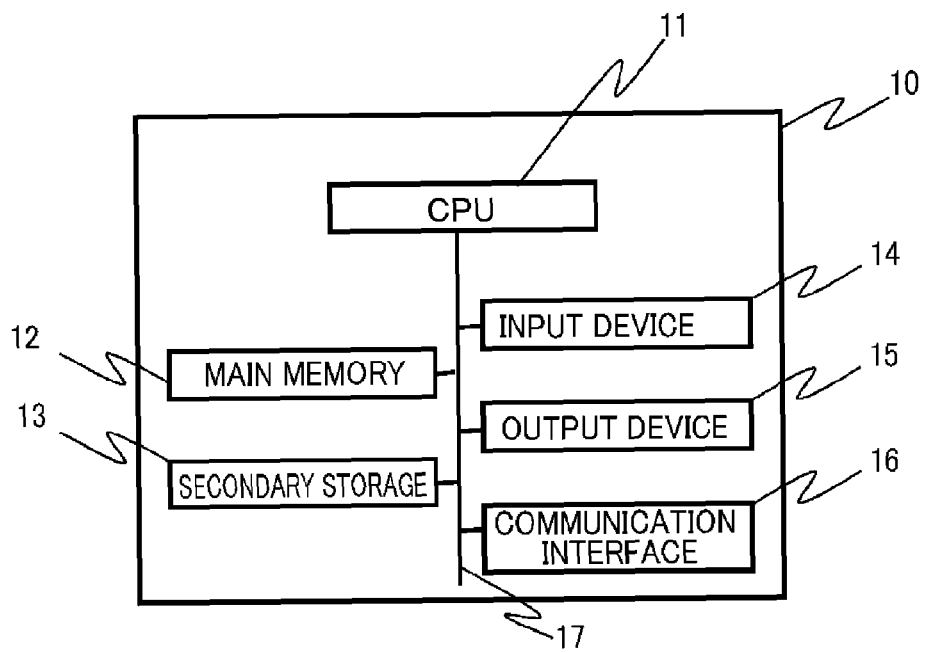

[Fig. 3]
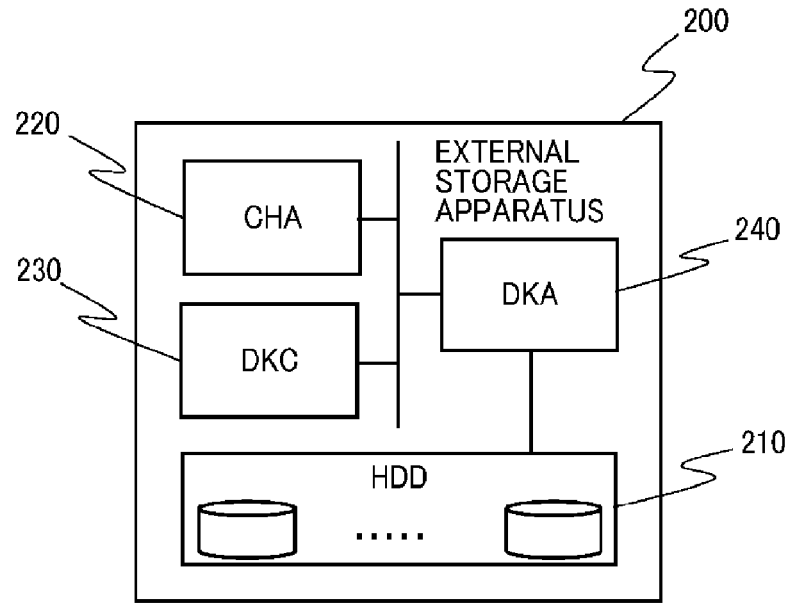
[Fig. 4]
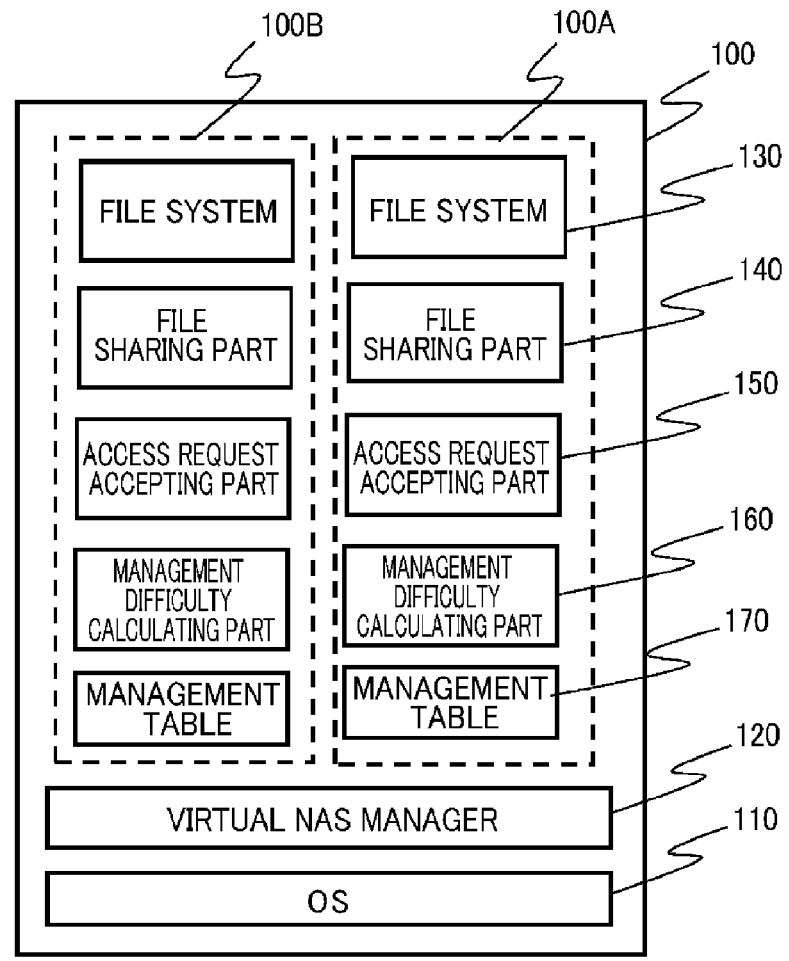

[Fig. 5]
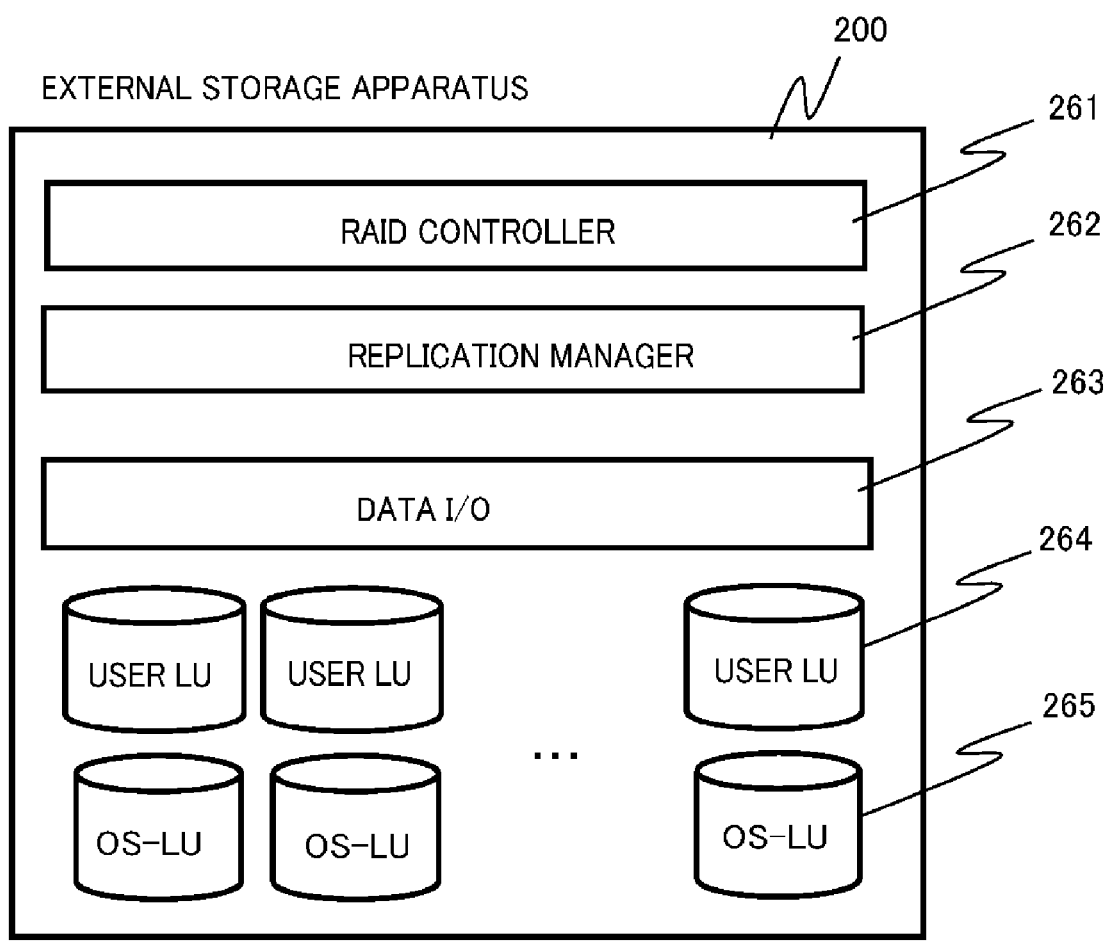

[Fig. 6]
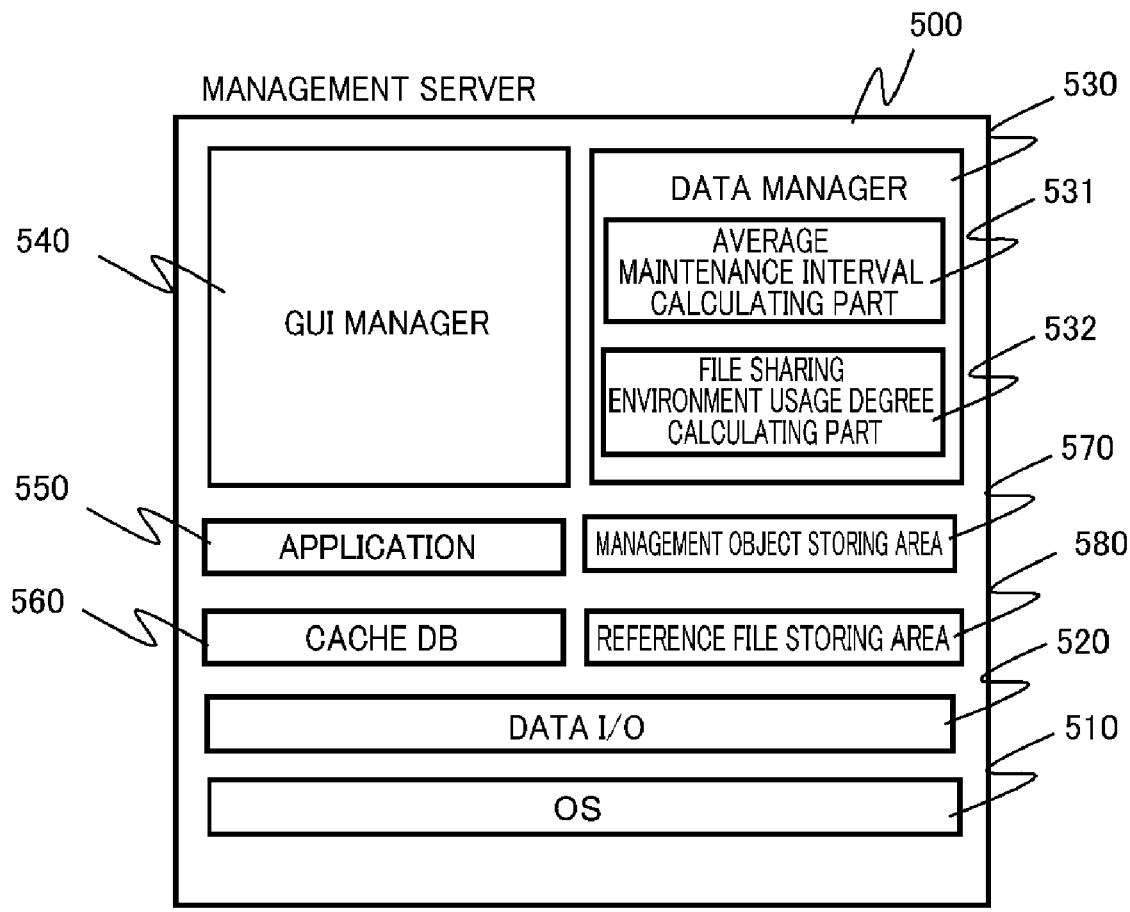
[Fig. 7]
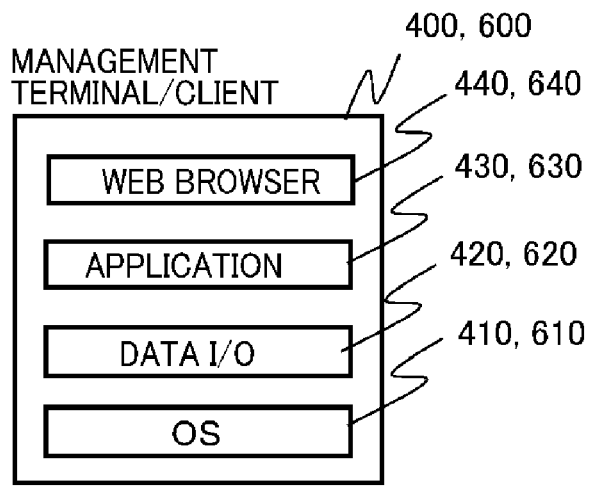

[Fig. 8]
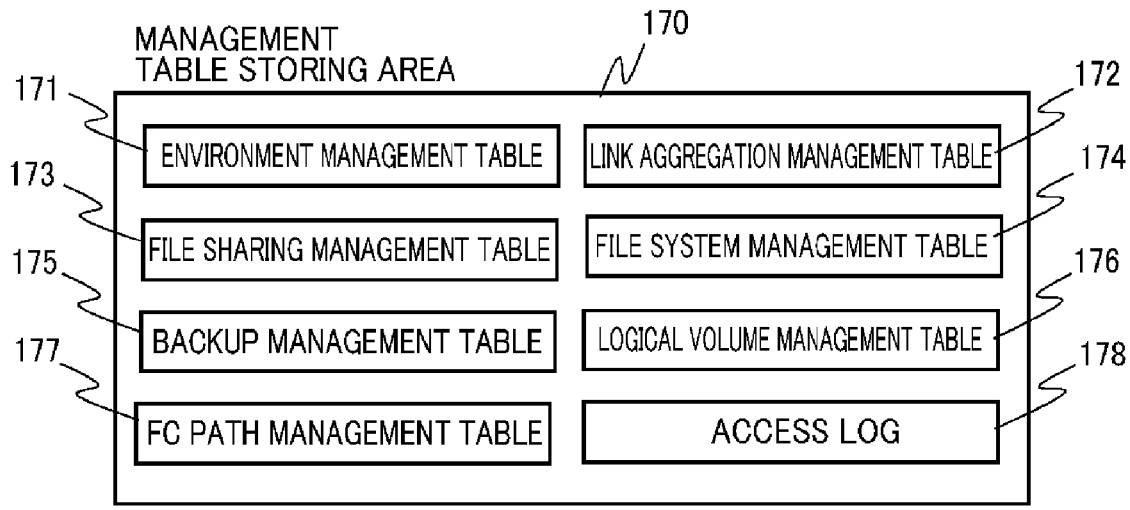
[Fig. 9]
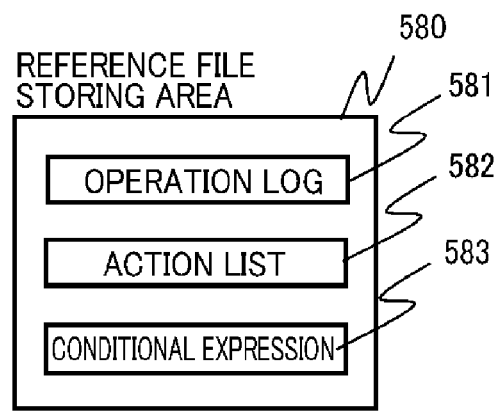
[Fig. 10]
OPERATION LOG 1000 (581)
| DATE AND TIME | OPERATION | OPERATION OBJECT | OPERATOR NAME |
|---|---|---|---|
| 2009/5/14 10:15:00 | CREATE FILE SYSTEM | env-02 | user-01 |
| 2009/5/14 11:12:00 | ADD MAC ADDRESS (LINK AGGREGATION) | env-01 | user-02 |
| 2009/5/14 11:20:00 | DELETE FILE SYSTEM | env-01 | user-02 |
| 2009/5/14 11:18:00 | ADD FC PATH | env-02 | user-01 |
| 2009/5/14 11:45:00 | DELETE FILE SYSTEM | env-01 | user-02 |
| 2009/5/14 11:50:00 | DELETE ACL | env-01 | user-01 |
| : | : | : | : |
1010　1020　1030　1040

[Fig. 11]

ACCESS LOG 1100 (178)

| DATE AND TIME | FILE PATH NAME | OPERATION | USER NAME |
|---|---|---|---|
| 2009/5/14 10:15:00 | /File-1.txt | Read | user-01 |
| 2009/5/14 11:12:23 | /Holder-1/File-3.txt | Write | user-02 |
| ⋮ | ⋮ | ⋮ | ⋮ |
| 2009/5/15 23:12:23 | /Holder-2/File-5.txt | Write | user-0X |
| ⋮ | ⋮ | ⋮ | ⋮ |

Columns: 1110, 1120, 1130, 1140

[Fig. 12]

ENVIRONMENT MANAGEMENT TABLE 1200 (171)

| FILE SHARING ENVIRONMENT NAME | VIRTUAL NAS NAME | NETWORK | FILE SHARE | FILE SYSTEM | BACKUP | LOGICAL VOLUME | FC PATH |
|---|---|---|---|---|---|---|---|
| env-01 | vnas-01 | 1 | 1 | 1 | 1 | 1 | 1 |
| env-02 | vnas-02 | 1 | 1 | 1 | 0 | 0 | 0 |
| ⋮ | ⋮ | ⋮ | ⋮ | ⋮ | ⋮ | ⋮ | ⋮ |

Columns: 1210, 1220, 1230, 1240, 1250, 1260, 1270, 1280

[Fig. 13]

LINK AGGREGATION MANAGEMENT TABLE 1300 (172)

| IP ADDRESS | LINK AGGREGATION DEVICE NAME | PHYSICAL DEVICE NUMBER | PHYSICAL DEVICE NAME | FILE SHARING ENVIRONMENT NAME |
|---|---|---|---|---|
| 192.168.100.1 | agr-0 | 3 | eth1,eth2,eth3 | env-01 |
| 192.168.100.2 | agr-1 | 2 | eth4,eth5 | env-02 |
| ⋮ | ⋮ | ⋮ | ⋮ | ⋮ |

Columns: 1310, 1320, 1330, 1340, 1350

[Fig. 14]

FILE SHARING MANAGEMENT TABLE 1400 (173)

| FILE SHARE NAME | FILE SYSTEM NAME | PROTOCOL | SET ACL NUMBER | SET ACE NUMBER | FILE SHARING ENVIRONMENT NAME |
|---|---|---|---|---|---|
| File Share-01 | FS-1 | CIFS/NFS | 4 | 8 | env-01 |
| File Share-02 | FS-2 | NFS | 10 | 15 | env-02 |
| : | : | : | : | : | : |

[Fig. 15]

FILE SYSTEM MANAGEMENT TABLE 1500 (174)

| FILE SYSTEM NAME (LOGICAL VOLUME NAME) | USER NAME | QUOTA LIMITATION SYSTEM |
|---|---|---|
| FS-1(LV-01) | User01 | BLOCK NUMBER LIMITATION FILE NUMBER LIMITATION |
|  | User02 | FILE NUMBER LIMITATION |
|  | : | : |
| FS-2(LV-02) |  | FILE NUMBER LIMITATION |
|  | : | : |

[Fig. 16]

BACKUP MANAGEMENT TABLE 1600 (175)

| FILE SYSTEM NAME | BACKUP MEANS | BACKUP DESTINATION |
|---|---|---|
| FS-1 | SNAPSHOT | REMOTE |
| FS-1 | TAPE | LOCAL |
| FS-2 | NONE |  |
| : | : | : |

[Fig. 17]

LOGICAL VOLUME MANAGEMENT TABLE 1700 (176)

| LOGICAL VOLUME NAME | LU NUMBER | LU IDENTIFICATION INFORMATION | COUNT OF ADDITION |
|---|---|---|---|
| LV-01 | 4 | LU1,LU2,LU3, LU4 | 2 |
| LV-02 | 4 | LU5,LU6,LU7,LU8 | 3 |
| : | : | : | |

[Fig. 18]

FC PATH MANAGEMENT TABLE 1800 (177)

| PATH NAME | HOST WWN | ARRAY WWN | ACCESSIBLE LU | FILE SHARING ENVIRONMENT NAME |
|---|---|---|---|---|
| FC-01 | 10:00:00:22:33:00:55:61 | 20:00:00:12:40:00:11:99 | LU1,LU2,LU3, LU4 | env-01 |
| FC-02 | 12:34:56:00:01:78:65:43 | 98:76:54:01:23:45:67:89 | LU1,LU2,LU3, LU4 | env-02 |
| : | : | : | | |

[Fig. 19]
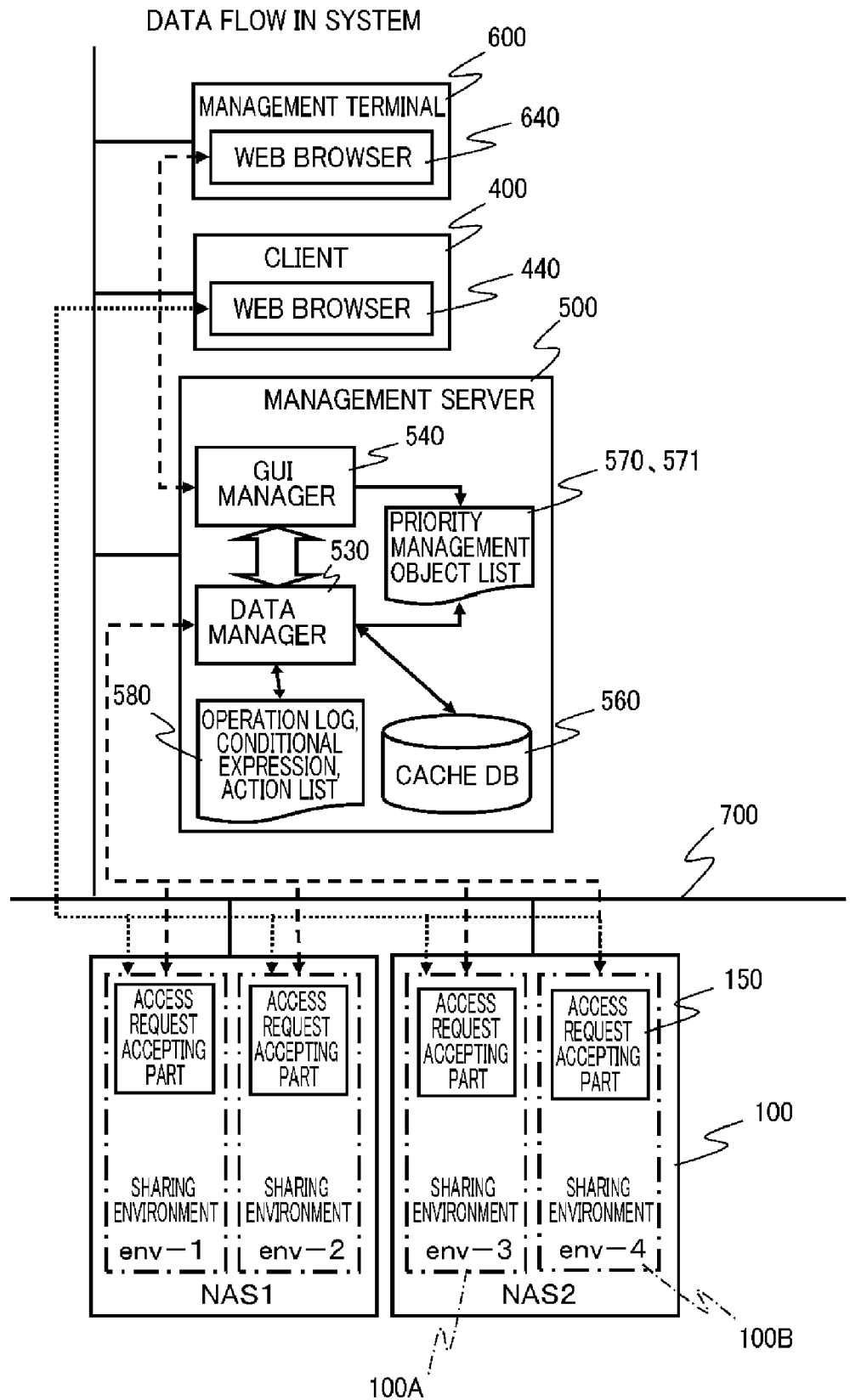

[Fig. 20]
EXAMPLE OF PROCESSING FLOW BY ACCESS
REQUEST ACCEPTING PART (NAS)
(ACCESS FROM CLIENT)
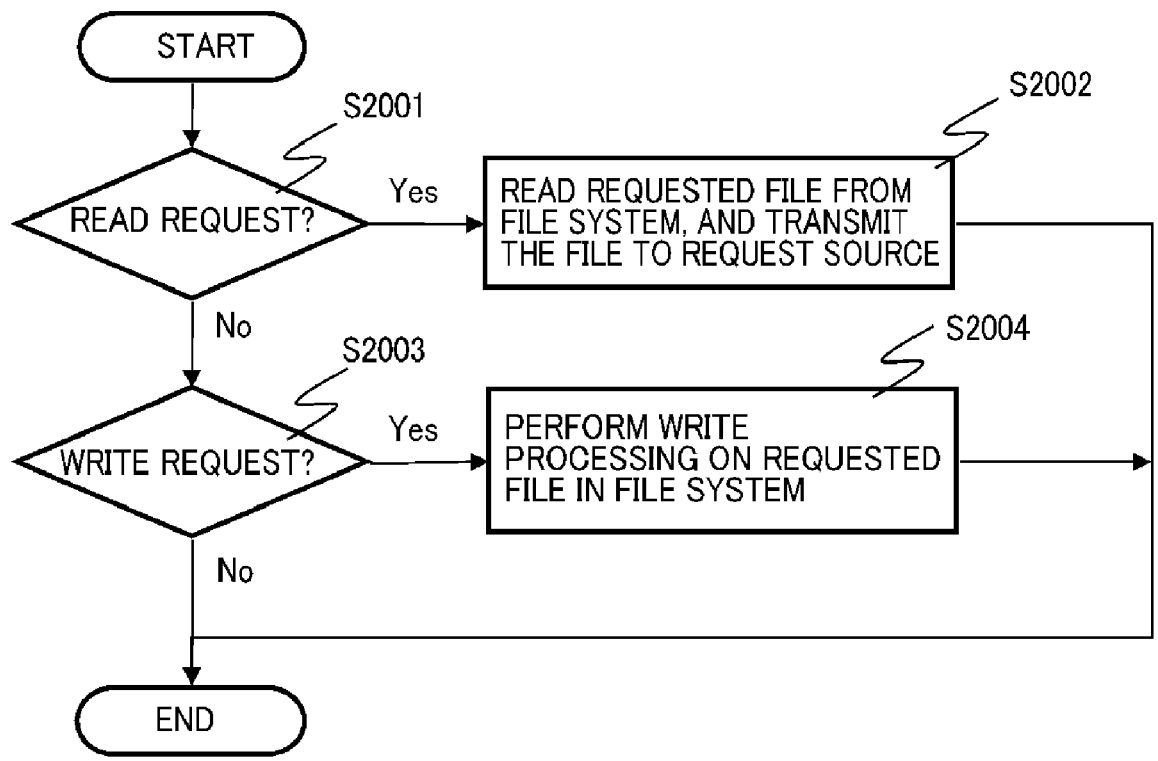

[Fig. 21]
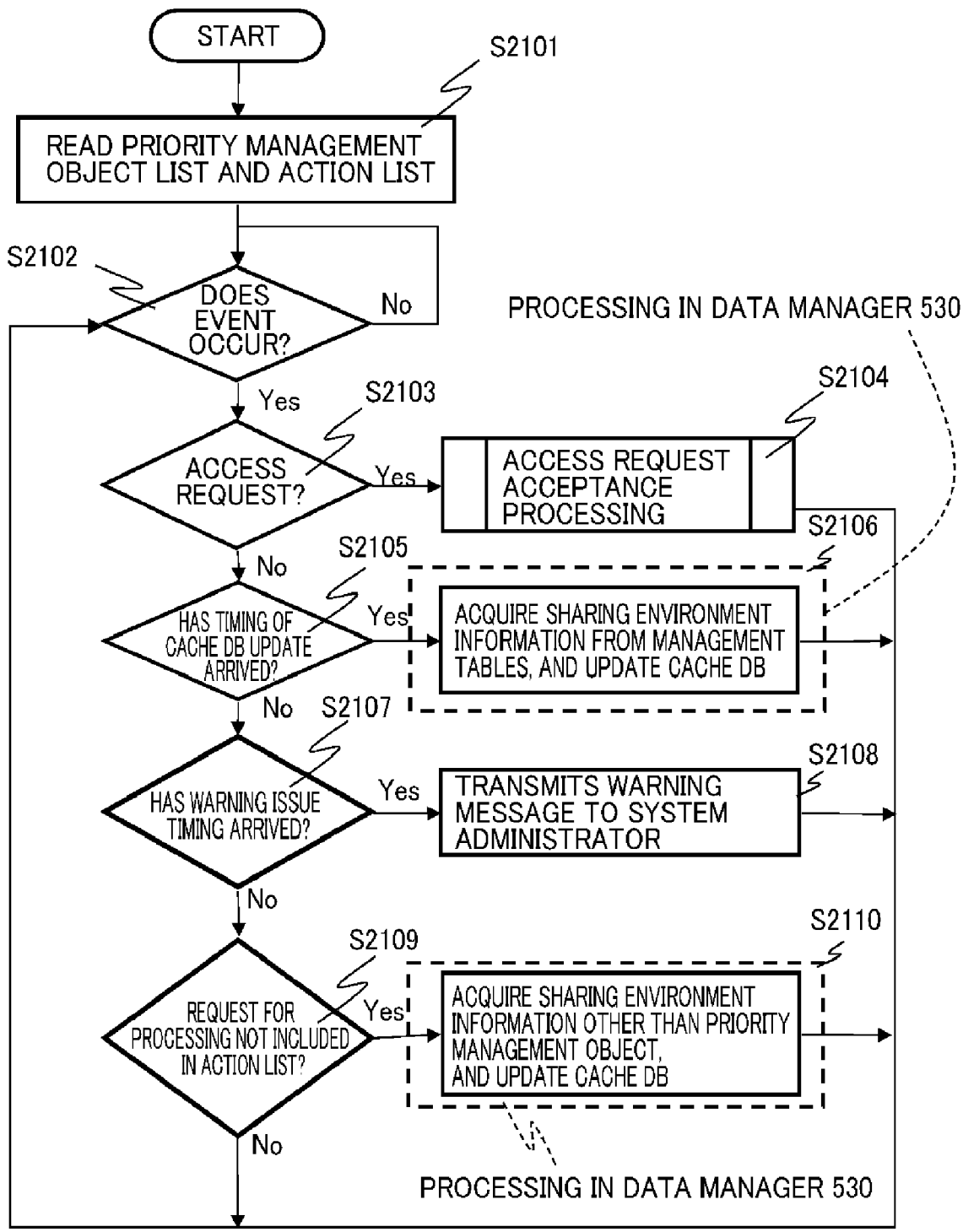

[Fig. 22]
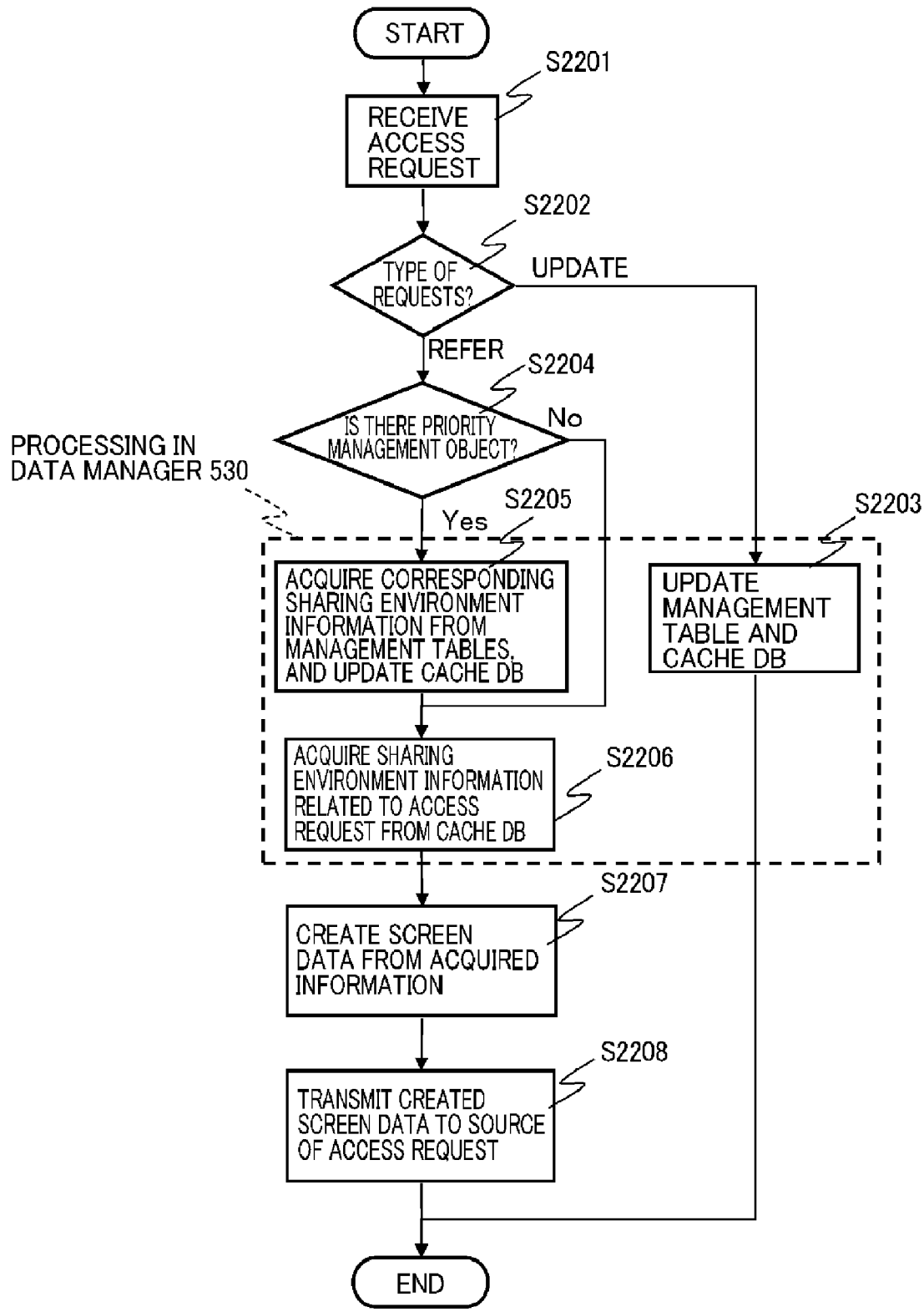

[Fig. 23]
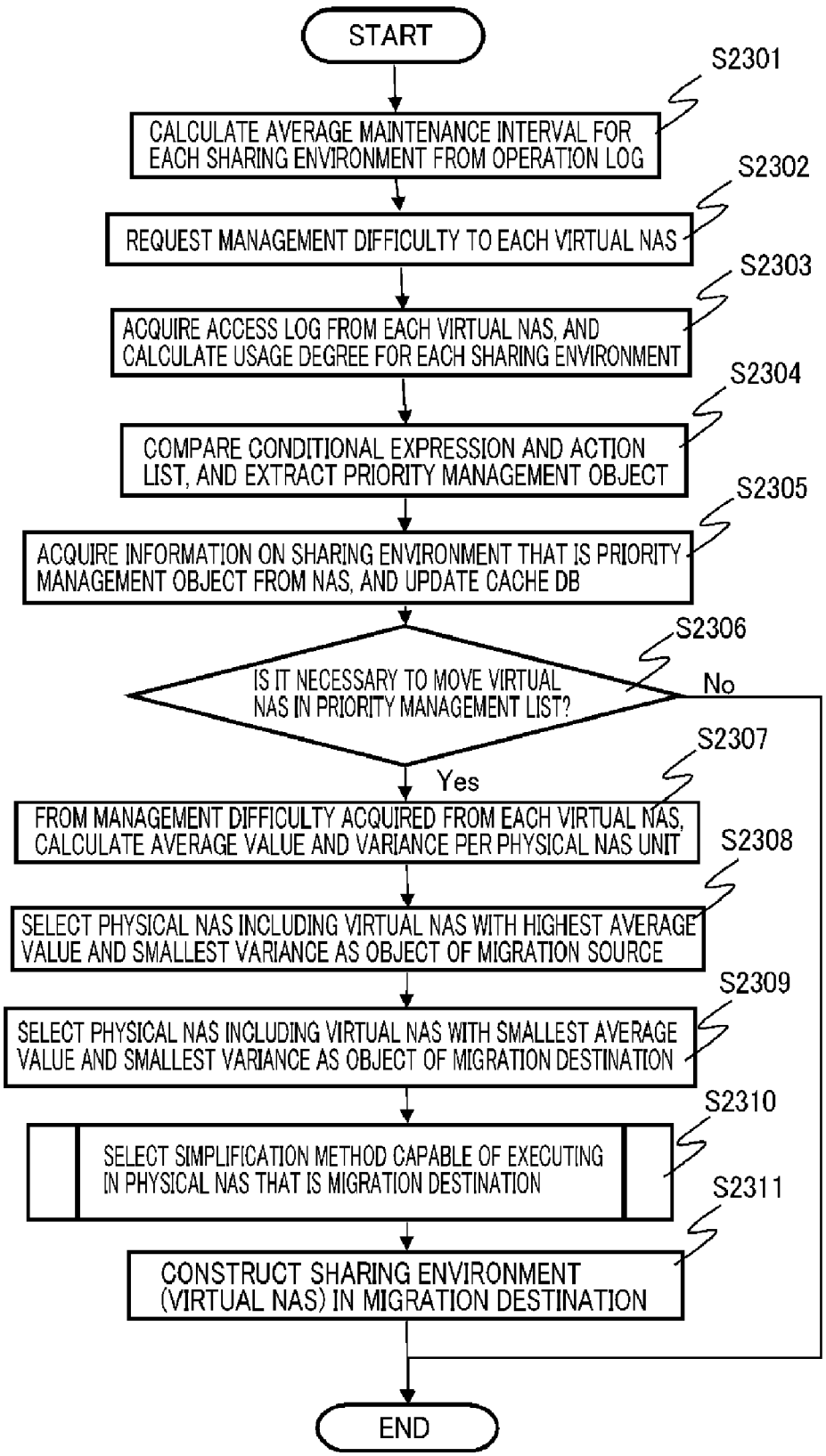

[Fig. 24]
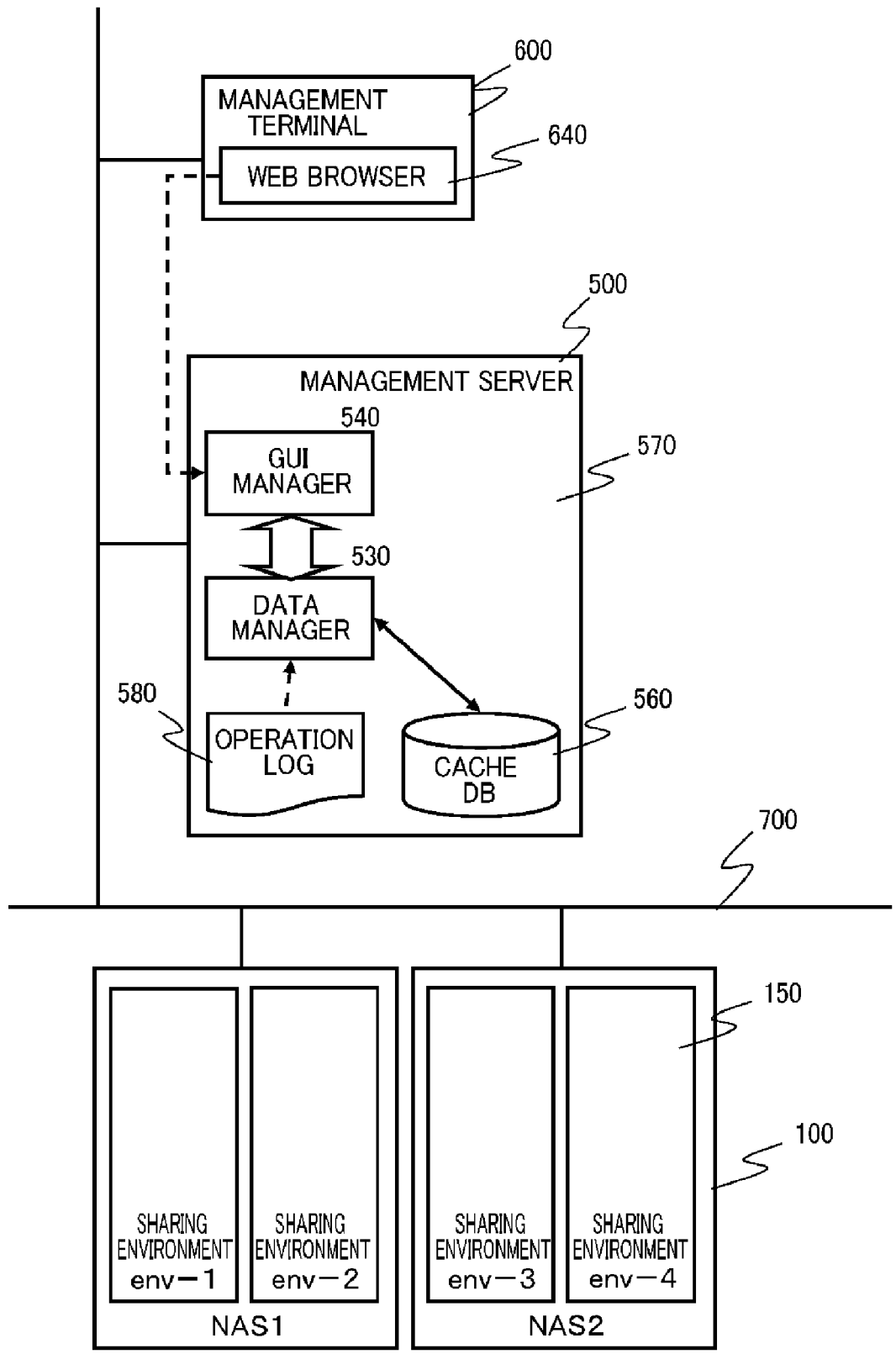

[Fig. 25]
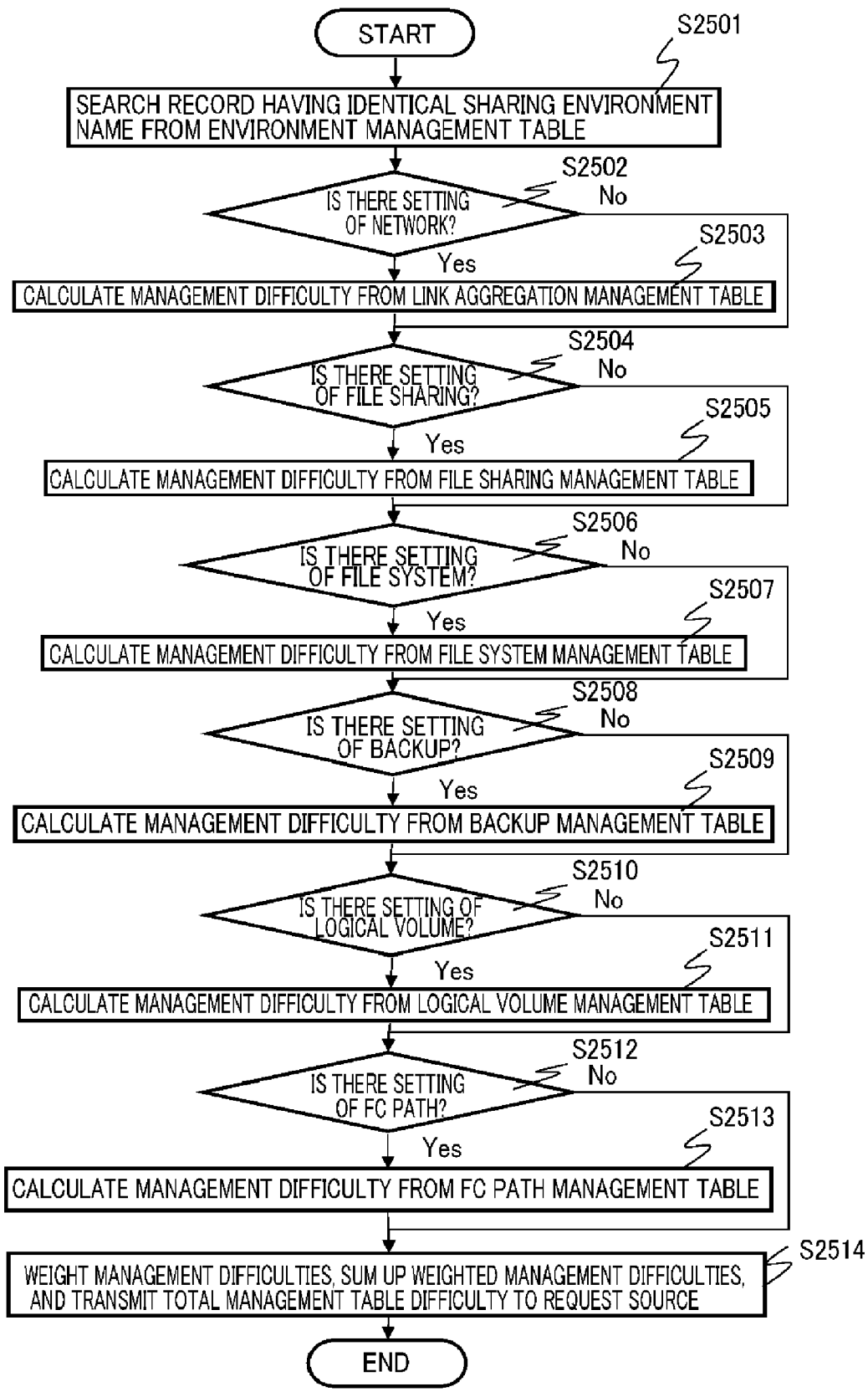

[Fig. 26]
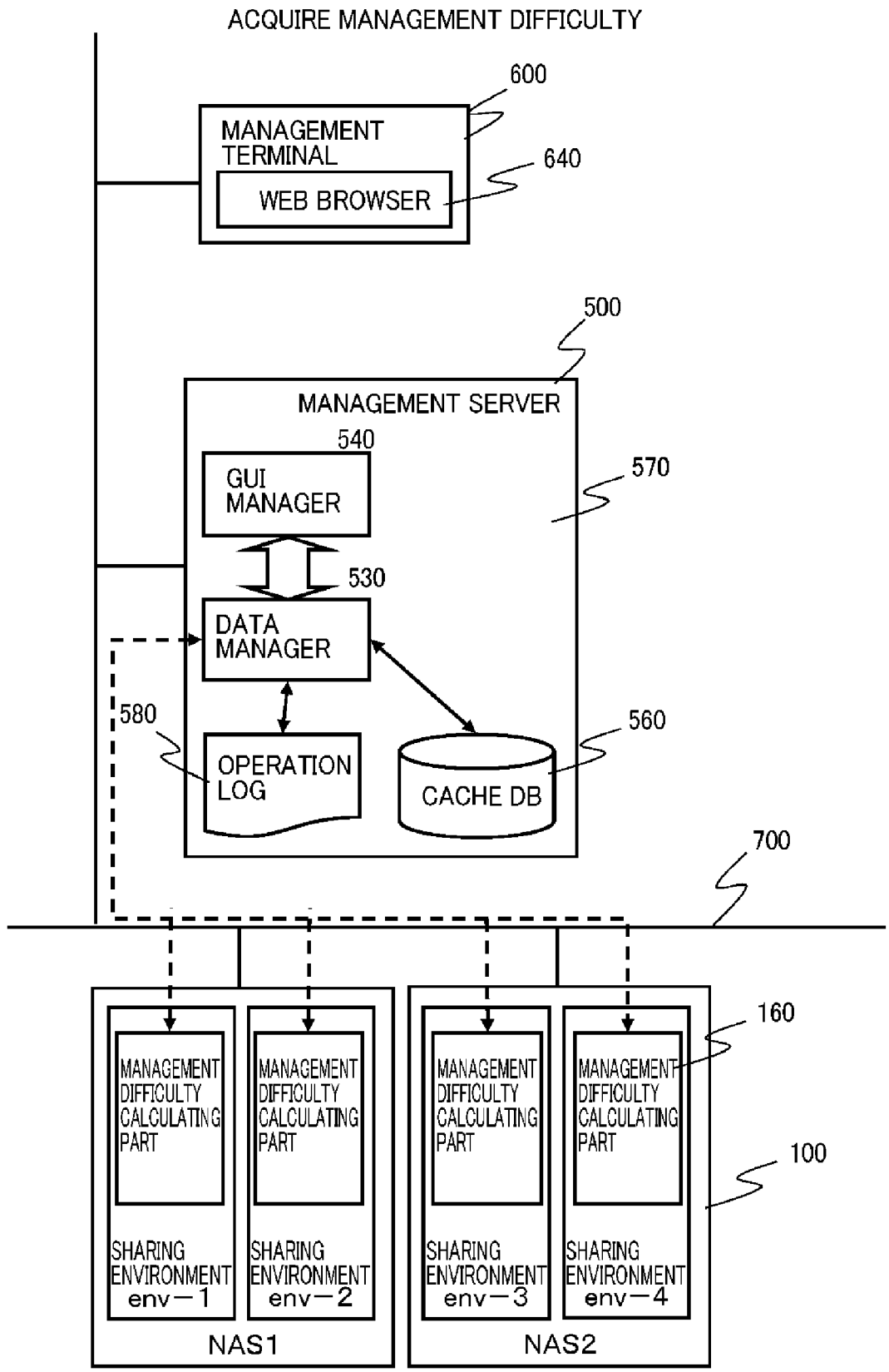

[Fig. 27]
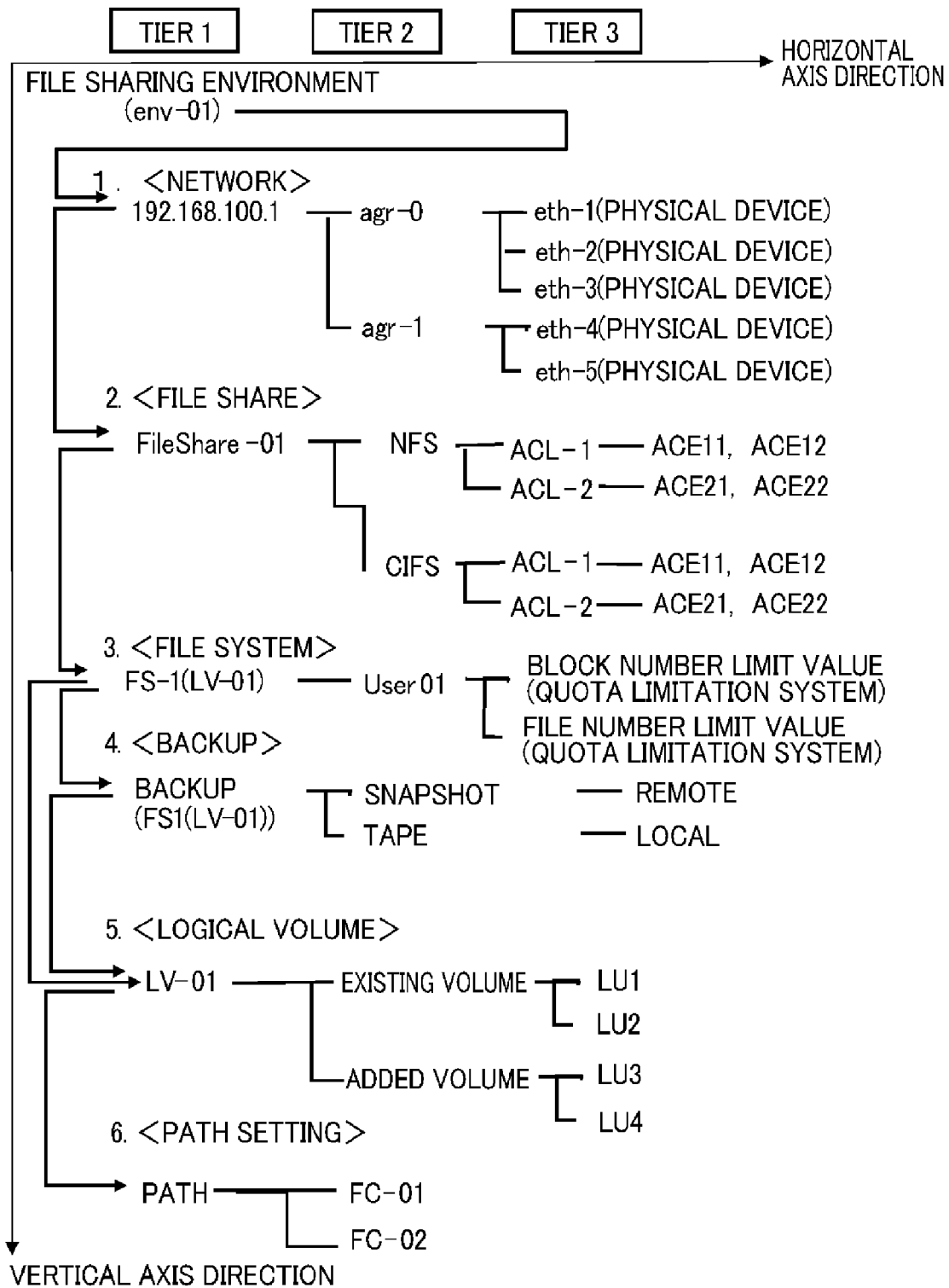

[Fig. 28]

CALCULATION EXAMPLE OF MANAGEMENT DIFFICULTY RELATED TO NETWORK

| $X_j$ (REDUNDANCY) \ $j$ (TIER LEVEL) | IP ADDRESS $j=1$ | LINK AGGREGATION $j=2$ | PHYSICAL DEVICE $j=3$ | MANAGEMENT DIFFICULTY |
|---|---|---|---|---|
| NUMBER OF IP ADDRESSES =1 | $j * X_j = 1*1 = 1$ | | | 1 |
| NUMBER OF LINK AGGREGATION =2 | | $j * X_j = 2*2 = 4$ | | 4 |
| NUMBER OF PHYSICAL DEVICES =5 | | | $j * X_j = 3*5 = 15$ | 15 |
| | | | | MANAGEMENT DIFFICULTY =1+4+15=20 |

[Fig. 29]

CALCULATION EXAMPLE OF MANAGEMENT DIFFICULTY RELATED TO FILE SHARING

| $X_j$ (REDUNDANCY) \ $j$ (TIER LEVEL) | FileShare-01 $j=1$ | NFS/CIFS $j=2$ | ACL $j=3$ | ACE $j=4$ | MANAGEMENT DIFFICULTY |
|---|---|---|---|---|---|
| NUMBER OF FILE SHARING =1 | $j * X_j = 1*1 = 1$ | | | | 1 |
| NFS/CIFS=2 | | $j * X_j = 2*2 = 4$ | | | 4 |
| ACL=4 | | | $j * X_j = 3*4 = 12$ | | 12 |
| ACE=5 | | | | $j * X_j = 4*5 = 20$ | 20 |
| | | | | | MANAGEMENT DIFFICULTY =1+4+12+20=37 |

[Fig. 30]

CALCULATION EXAMPLE OF MANAGEMENT DIFFICULTY RELATED TO FILE SYSTEM

| $X_j$ (REDUNDANCY) \ j (TIER LEVEL) | FILE SYSTEM j=1 | UserID j=2 | QUOTA LIMITATION SYSTEM j=3 | MANAGEMENT DIFFICULTY |
|---|---|---|---|---|
| NUMBER OF FILE SYSTEMS=1 | $j*X_j = 1*1 = 1$ | | | 1 |
| NUMBER OF USERS=1 | | $j*X_j = 2*1 = 2$ | | 2 |
| NUMBER OF QUOTA SETTINGS=2 | | | $j*X_j = 3*2 = 6$ | 6 |
| | | | | MANAGEMENT DIFFICULTY =1+2+6=9 |

[Fig. 31]

CALCULATION EXAMPLE OF MANAGEMENT DIFFICULTY RELATED TO BACKUP

| $X_j$ (REDUNDANCY) \ j (TIER LEVEL) | BACKUP j=1 | BACKUP METHOD j=2 | BACKUP DESTINATION j=3 | MANAGEMENT DIFFICULTY |
|---|---|---|---|---|
| NUMBER OF BACKUP OBJECTS=1 | $j*X_j = 1*1 = 1$ | | | 1 |
| NUMBER OF BACKUP SETTINGS=2 (FOR EXAMPLE, TAPE/SNAPSHOT) | | $j*X_j = 2*2 = 4$ | | 4 |
| NUMBER OF BACKUP DESTINATION SETTINGS=2 (FOR EXAMPLE, REMOTE/LOCAL) | | | $j*X_j = 3*2 = 6$ | 6 |
| | | | | MANAGEMENT DIFFICULTY =1+4+6=11 |

[Fig. 32]

CALCULATION EXAMPLE OF MANAGEMENT DIFFICULTY RELATED TO LOGICAL VOLUME

| $X_j$ (REDUNDANCY) \ j (TIER LEVEL) | LOGICAL VOLUME j=1 | VOLUME USAGE (EXISTING/ ADDED) j=2 | LU j=3 | MANAGEMENT DIFFICULTY |
|---|---|---|---|---|
| NUMBER OF LOGICAL VOLUMES=1 | j*Xj = 1*1 = 1 | | | 1 |
| NUMBER OF MIRRORING=2 | | j*Xj = 2*2 = 4 | | 4 |
| NUMBER OF LUs=4 | | | j*Xj = 3*4 = 12 | 12 |
| | | | | MANAGEMENT DIFFICULTY =1+4+12=17 |

[Fig. 33]

CALCULATION EXAMPLE OF MANAGEMENT DIFFICULTY RELATED TO FC PATH

| $X_j$ (REDUNDANCY) \ j (TIER LEVEL) | LOGICAL FC PATH j=1 | PHYSICAL FC PATH j=2 | | MANAGEMENT DIFFICULTY |
|---|---|---|---|---|
| NUMBER OF PATHS=1 | j*Xj = 1*1 = 1 | | | 1 |
| NUMBER OF FC PATHS=2 | | j*Xj = 2*2 = 4 | | 4 |
| | | | | MANAGEMENT DIFFICULTY =1+4=5 |

[Fig. 34]
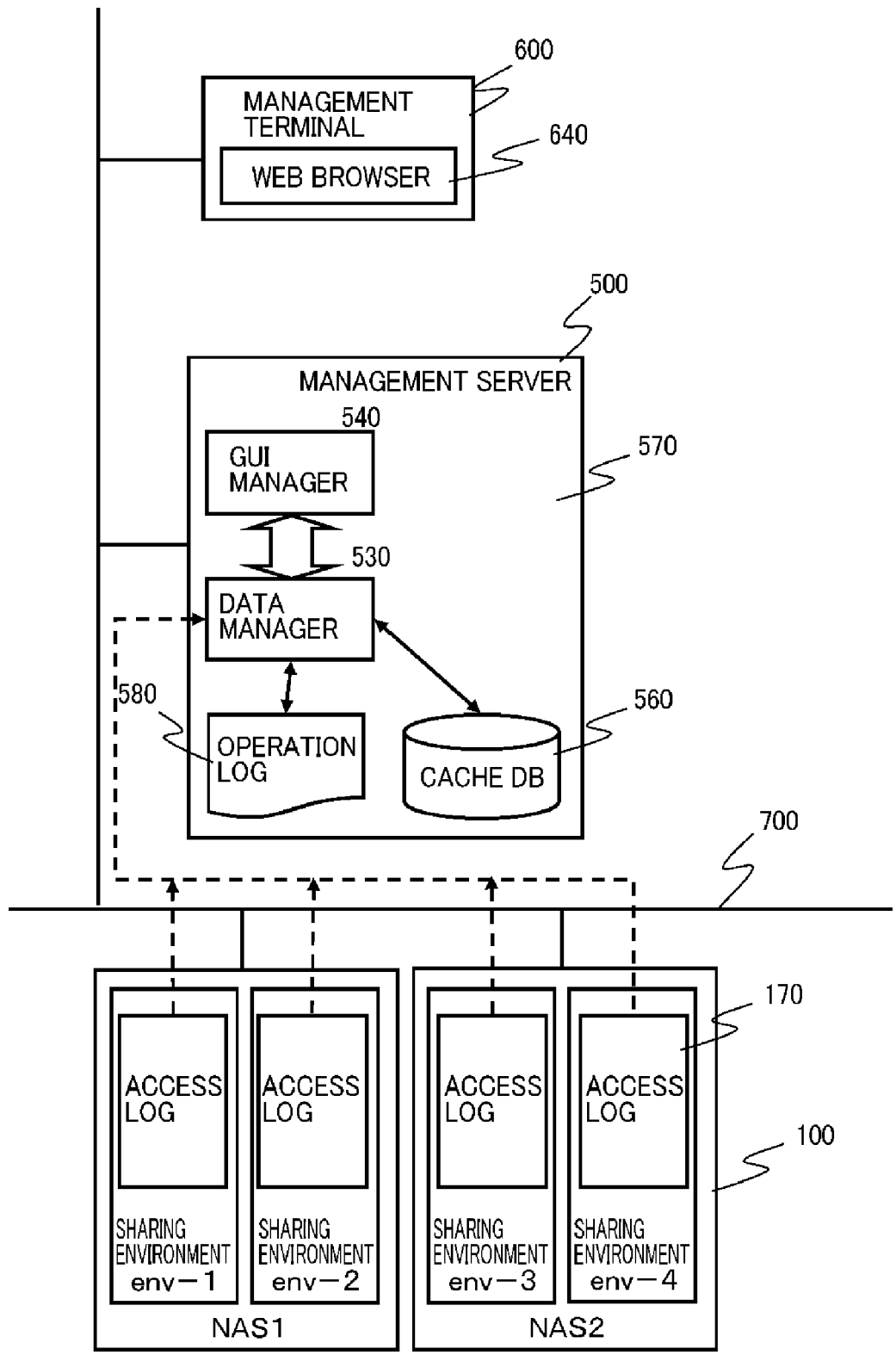

[Fig. 35]
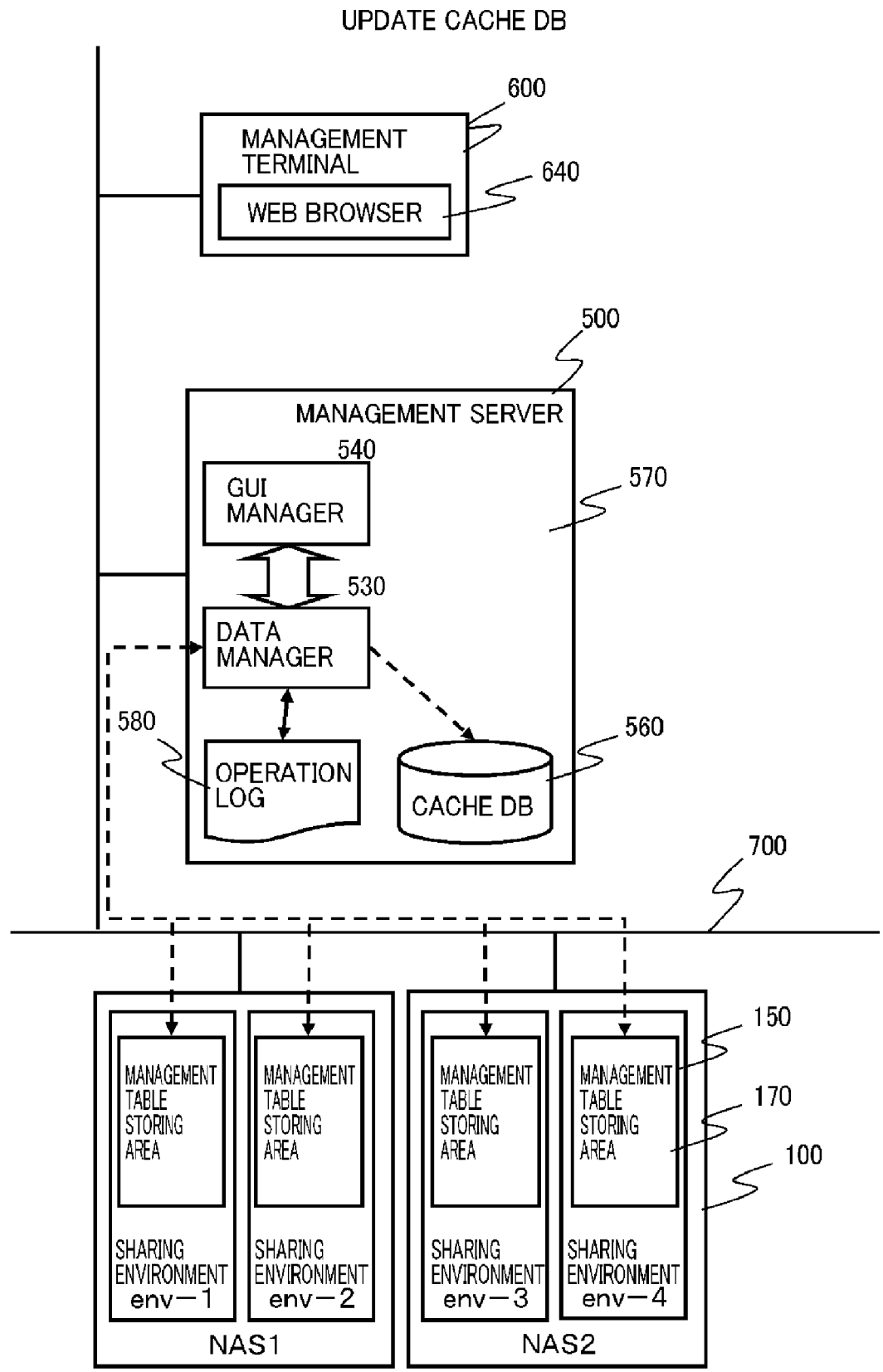

[Fig. 36]
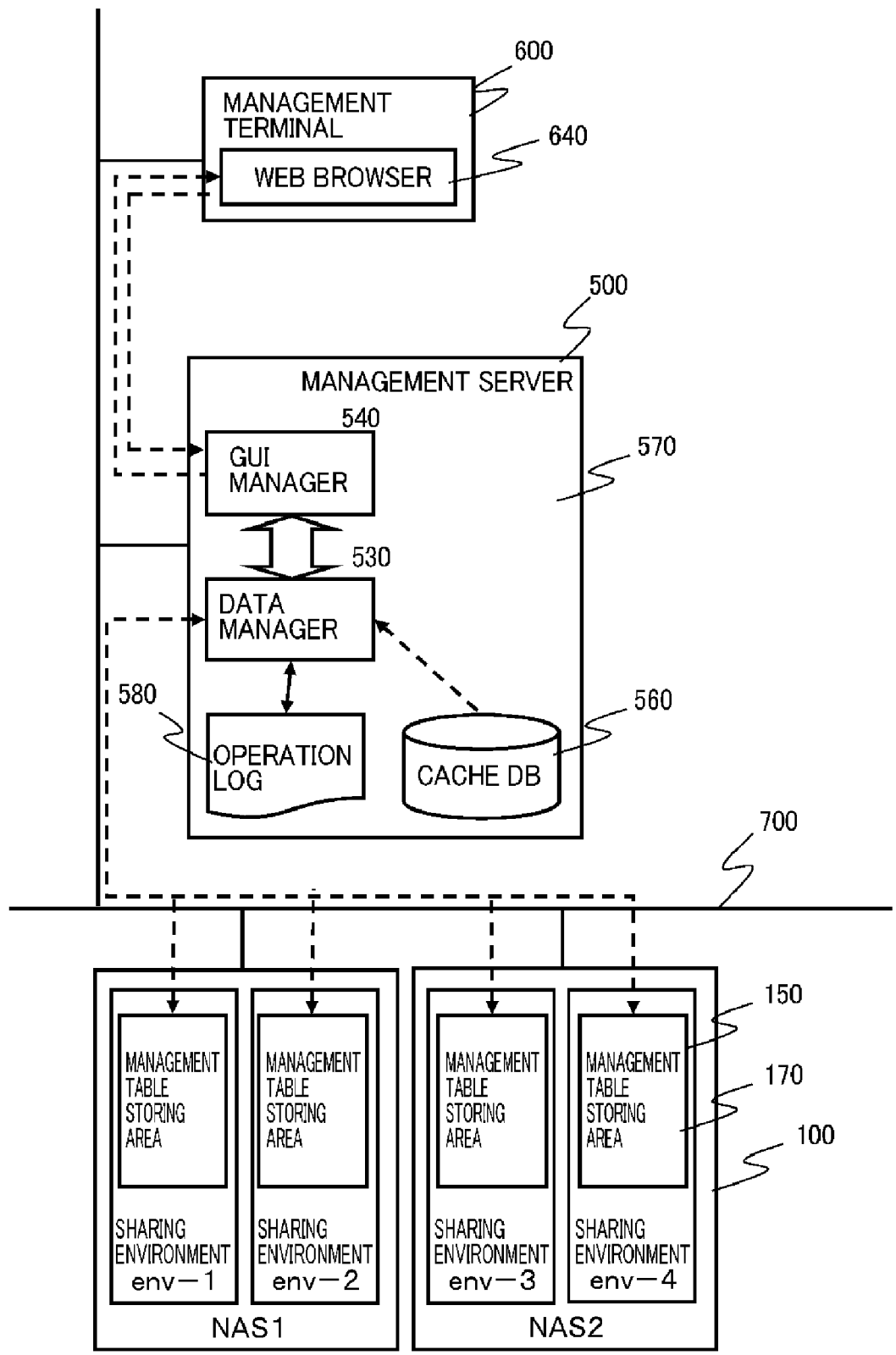

[Fig. 37]
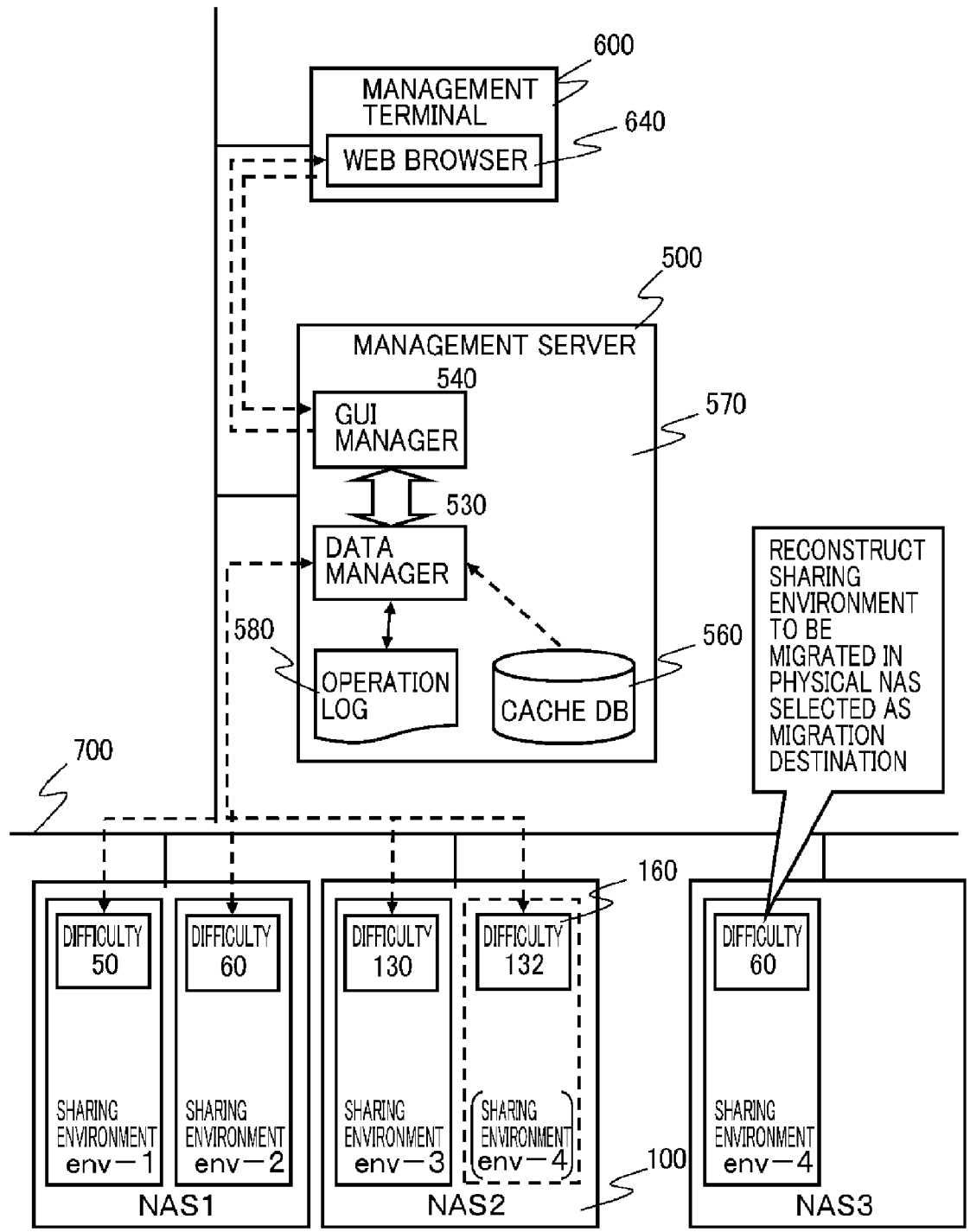

[Fig. 38]

CONFIGURATION EXAMPLE OF NETWORK SHARING

| IP ADDRESS | LINK AGGREGATION DEVICE NAME | PHYSICAL DEVICE NUMBER | PHYSICAL DEVICE NAME | FILE SHARING ENVIRONMENT NAME |
|---|---|---|---|---|
| 192.168.100.1 | agr-0 | 3 | eth1, eth2, eth3 | env-01 (vnas-01) |
| 192.168.100.2 | agr-0 | 3 | eth1, eth2, eth3 | env-02 (vnas-02) |
| : | : | : | : | : |

[Fig. 39]

SETTING EXAMPLE OF CONDITIONAL EXPRESSION

```
CONDITIONAL EXPRESSION                              ACTION ITEMS
(MANAGEMENT DIFFICULTY > REFERENCE VALUE × 4) AND
(USAGE DEGREE > REFERENCE VALUE × 4) OR
(AVERAGE MAINTENANCE INTERVAL > REFERENCE VALUE × 4)
                                                    ACTION 1

(MANAGEMENT DIFFICULTY > REFERENCE VALUE × 4) AND
(REFERENCE VALUE × 2 < AVERAGE MAINTENANCE INTERVAL <
REFERENCE VALUE × 4) OR (REFERENCE VALUE × 2 < USAGE DEGREE <
REFERENCE VALUE × 4)
                              :                     ACTION 2
                              :                        :
                              :                        :
                                                       :
OTHERS                                              ACTION 9
```

[Fig. 40]

SETTING EXAMPLE OF ACTION LIST          582

```
ACTION 1:
  · CACHE DB UPDATE TIMING: AT TIME OF OPERATION OR EVERY OTHER HOUR
  · WARNING ISSUE INTERVAL = 0.5 HOUR
  · VIRTUAL NAS MOVEMENT = YES

ACTION 2:
  · CACHE DB UPDATE TIMING: AT TIME OF OPERATION OR EVERY TWO HOURS
  · WARNING ISSUE INTERVAL = 5 HOURS

ACTION 3:
  · CACHE DB UPDATE TIMING: AT TIME OF OPERATION OR EVERY THREE HOURS
  · WARNING ISSUE INTERVAL = 10 HOURS
            ⋮

ACTION 9:
  · CACHE DB UPDATE TIMING: AT TIME OF OPERATION
  · WARNING ISSUE NONE
  · OUT OF PRIORITY MANAGEMENT
```

[Fig. 41]

SETTING EXAMPLE OF PRIORITY MANAGEMENT OBJECT LIST
                                                571

| SHARING ENVIRONMENT NAME | APPLIED ACTION NAME |
|---|---|
| env-01 | ACTION 1 |
| env-02 | ACTION 2 |
| env-03 | ACTION 3 |
| ⋮ | ⋮ |

[Fig. 42]
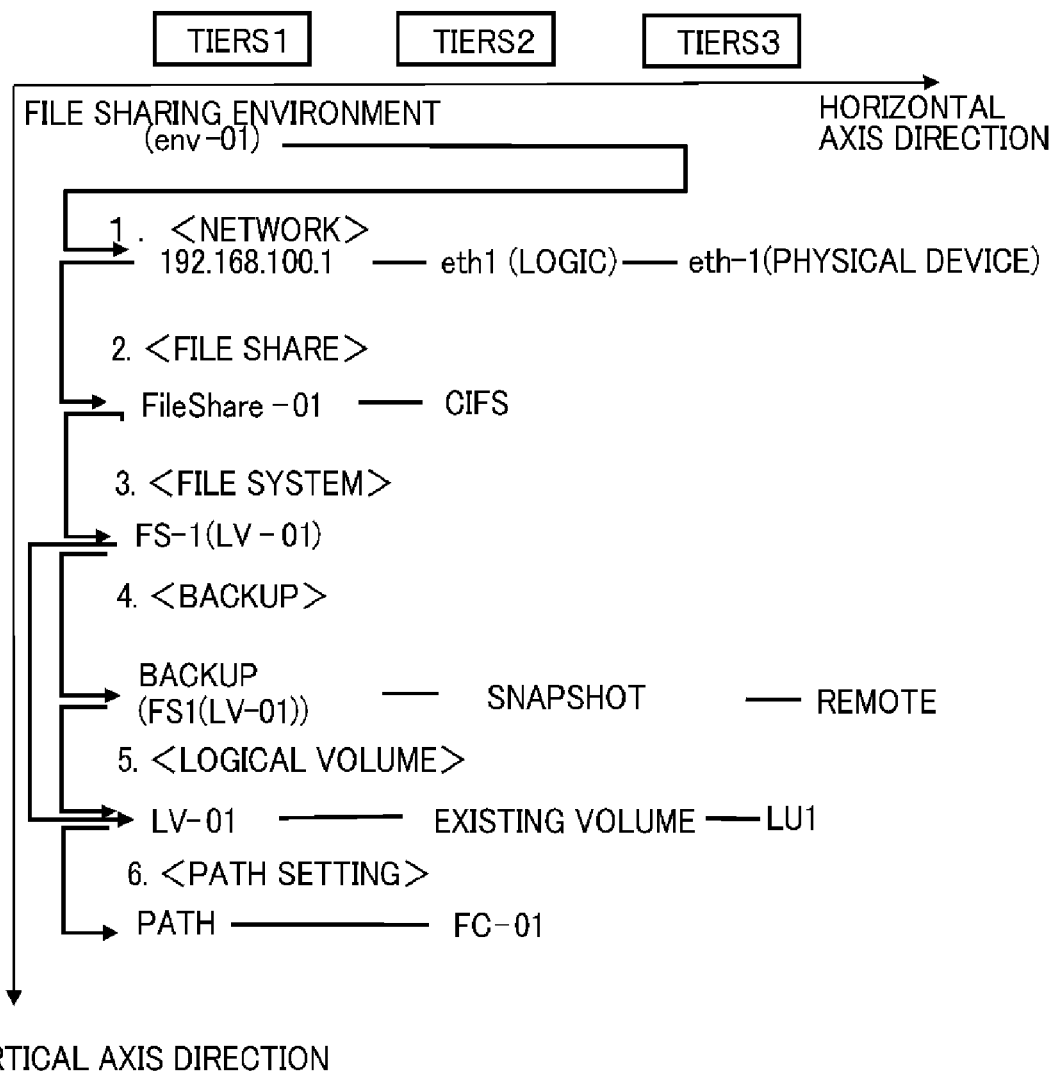

[Fig. 43]
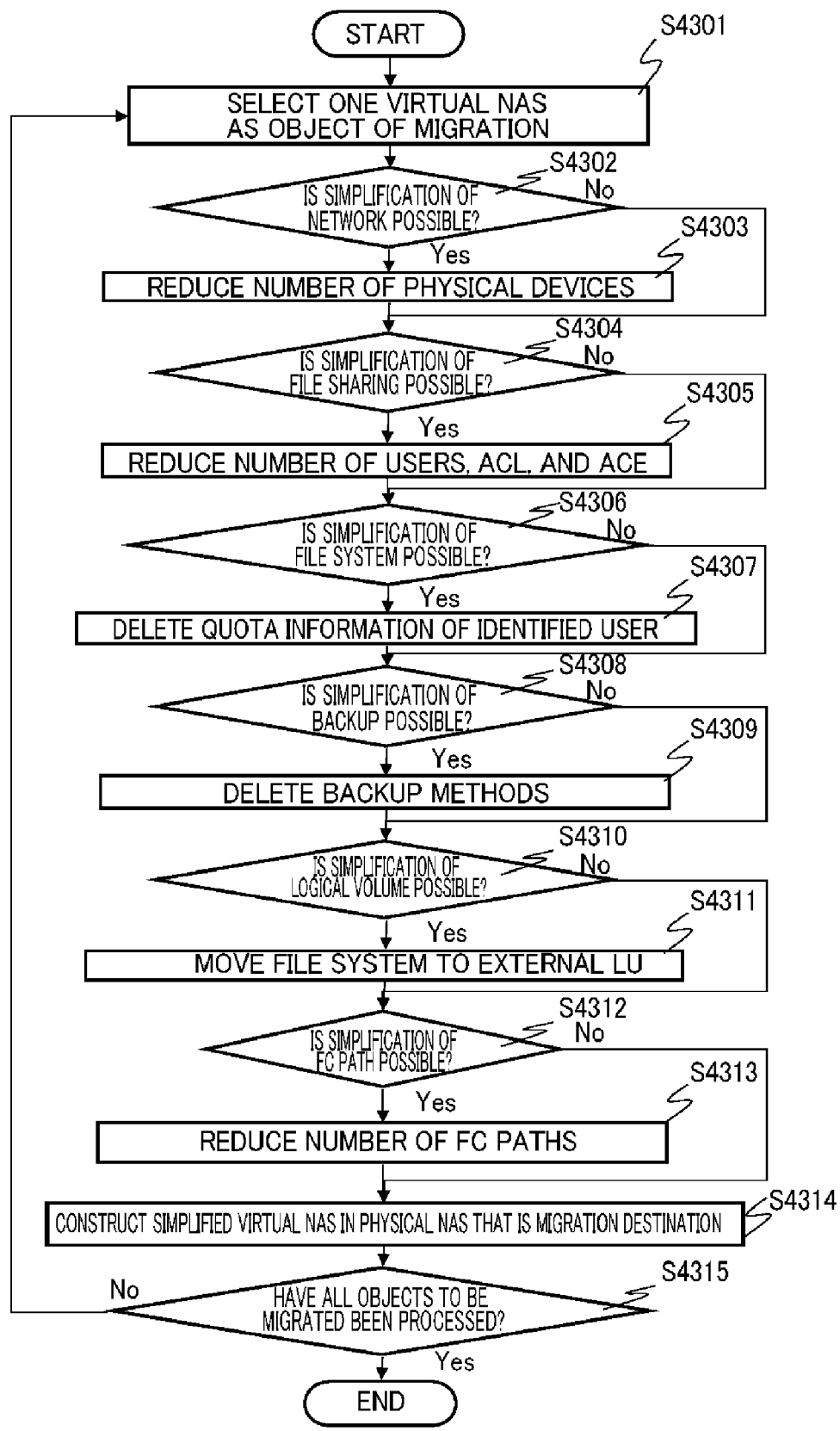

MANAGEMENT SYSTEM AND MANAGEMENT METHOD FOR STORAGE SYSTEM

TECHNICAL FIELD

The present invention relates to a management system and a management method for a storage system, and particularly relates to a management system and a management method for a storage system which are capable of, in a storage system having a plurality of file sharing environments, specifying difficulty in management for each of the file sharing environments and executing a proper management based on each difficulty.

BACKGROUND ART

As a storage apparatus that provides a data storage area for a host computer on which various applications operate, a network attached storage (hereinafter, referred to as "NAS") has been employed in storage systems with various scales. The NAS is coupled to the host computer via a network, and includes a file system capable of managing data per file unit.

In such a NAS, due to the request in use of the applications or the like operating on the coupled host computer, the configuration has been employed in which a plurality of file systems or logical volumes are provided in one physical NAS, and a plurality of virtual NASs (referred to as "virtual NAS" in contrast with the physical NAS described above) including the file systems or logical volumes operate.

Patent Document 1 discloses a management method for a storage system in which a plurality of file systems or logical volumes are provided in one physical NAS, for example. More specifically, the technique disclosed in Patent Document 1 relates to a screen data generation method that aims to provide an environment that allows an easy execution of a setting related to a data copy among a number of logical volumes.

CITATION LIST

Patent Literature

PTL 1: Japanese Patent Application Laid-open Publication No. 2004-234556

SUMMARY OF INVENTION

Technical Problem

As described above, a plurality of file sharing environments can be constructed in one physical NAS, and the operation of a plurality of physical NASs increases the number of file sharing environments to be managed. Each of the file sharing environments includes components, such as a file system that stores data from a host computer, a plurality of logical units (hereinafter, referred to as "LUs") constituting the file system, a plurality of fibre channel (hereinafter, referred to as "FC") paths that communicably couples the plurality of physical NASs to a plurality of storage apparatuses, and a plurality of LAN (Local Area Network) ports for communicating with a plurality of host computers. Accordingly, the number of components to be managed further increases.

In such a state, sufficient management might not be executed to a certain file sharing environment which has a high frequency of use from the host computers but has a complicated configuration including a larger number of components. Accordingly, once any failure occurs, much time and effort are required to identify the cause thereof and to recover from the failure. This might cause disadvantage to a user who utilizes the storage area provided by the file sharing environment not sufficiently managed.

The present invention has been mainly made in view of the foregoing problems, and aims to propose a management system and a management method for a storage system, and particularly relates to a management system and a management method for a storage system which are capable of, in a storage system having a plurality of file sharing environments, specifying difficulty in management for each of the file sharing environments and executing a proper management based on each difficulty.

Solution to Problem

In order to solve the foregoing and other problems, one aspect of the present invention is a management system for a storage system, the storage system including a computer that executes data processing; a storage apparatus that provides a storage area for data processed in the computer; a plurality of file systems each of which enables the computer to input and output data from and to the storage apparatus per file unit; a storage control device in which a plurality of file sharing environments that enable a plurality of users to access a plurality of files managed by the file systems from the computer are constructed; a first communication network that communicably couples the computer to the storage control device; and a second communication network that communicably couples the storage apparatus to the storage control device. The management system comprises an average maintenance interval calculating part to calculate an average maintenance interval that is an average value of time intervals at which an operation command is given to each of the file sharing environments; a management difficulty calculating part, for each of the file sharing environments, to calculate a management difficulty that is an index quantitatively showing a difficulty to manage the file sharing environment and is determined based on a type and a quantity of resources included in the file sharing environment; a file sharing environment usage degree calculating part to calculate a file sharing environment usage degree that is an index showing a degree of usage of each of the file sharing environments and is determined based on an access frequency that is an index showing a frequency at which the users access the file sharing environment and the number of users who access the file sharing environment; a processing content keeping part that keeps numerical ranges and processing contents in association with each other, the numerical ranges being defined in advance respectively for the average maintenance interval, the management difficulty, and the file sharing environment usage degree, the processing contents being defined respectively for the average maintenance interval calculating part, the management difficulty calculating part, and the file sharing environment usage degree calculating part, in association with the numerical ranges; a management object storing area that keeps each of the file sharing environments and the processing content in association with each other, the processing content kept in the processing content keeping part; and a processing content executing part that executes the processing contents kept in the processing content keeping part in association with each of the file sharing environments.

Advantageous Effects of Invention

According to the present invention, a management system and a management method for a storage system capable of identifying the difficulty related to a management for each file sharing environment and executing a proper management based on each difficulty in the storage system having a plurality of file sharing environments can be proposed.

BRIEF DESCRIPTION OF DRAWINGS

FIG. 1 is a diagram showing a configuration example of a storage system 1 according to an embodiment of the present invention.

FIG. 2 is a diagram showing a configuration example of a computer 10 available as a client 400, a management server 500, and a management terminal 600 of the storage system 1.

FIG. 3 is a diagram showing a hardware configuration example of a storage apparatus 200.

FIG. 4 is a diagram showing a software configuration example of a NAS 100.

FIG. 5 is a diagram showing a software configuration example of the storage apparatus 200.

FIG. 6 is a diagram showing a software configuration example of the management server 500.

FIG. 7 is a diagram showing a software configuration example of the management terminal 600 and the client 400.

FIG. 8 is a diagram showing an example of a management table storing area 170 in the NAS 100.

FIG. 9 is a diagram showing an example of a reference file storing area 580 in the management server 500.

FIG. 10 is a view showing an example of an operation log 1000.

FIG. 11 is a view showing an example of an access log 1100.

FIG. 12 is a view showing an example of an environment management table 1200.

FIG. 13 is a view showing an example of a link aggregation management table 1300.

FIG. 14 is a view showing an example of a file sharing management table 1400.

FIG. 15 is a view showing an example of a file system management table 1500.

FIG. 16 is a view showing an example of a backup management table 1600.

FIG. 17 is a view showing an example of a logical volume management table 1700.

FIG. 18 is a view showing an example of an FC path management table 1800.

FIG. 19 is a schematic diagram showing an overview of a data flow in the storage system 1.

FIG. 20 is a flowchart showing an example of a data processing flow executed in an access request accepting part 150 in the NAS 100.

FIG. 21 is a flowchart showing an example of a data processing flow executed in a GUI manager 540 in the management server 500.

FIG. 22 is a flowchart showing an example of a data processing flow executed in an access request acceptance processing step S2104 shown in FIG. 21.

FIG. 23 is a flowchart showing an example of a data processing flow executed in a data manager 530 in the management server 500.

FIG. 24 is a schematic diagram showing an overview of average maintenance interval calculating processing in the storage system 1.

FIG. 25 is a flowchart showing an example of a data processing flow executed in a management difficulty calculating part 160 in the NAS 100.

FIG. 26 is a schematic diagram showing an overview of management difficulty calculating processing in the storage system 1.

FIG. 27 is a diagram showing an example of a concept of a management difficulty in a file sharing environment in this embodiment.

FIG. 28 is a view showing a calculation example of a management difficulty related to a network in the example shown in FIG. 27.

FIG. 29 is a view showing a calculation example of a management difficulty related to a file sharing in the example shown in FIG. 27.

FIG. 30 is a view showing a calculation example of a management difficulty related to a file system in the example shown in FIG. 27.

FIG. 31 is a view showing a calculation example of a management difficulty related to a backup in the example shown in FIG. 27.

FIG. 32 is a view showing a calculation example of a management difficulty related to a logical volume in the example shown in FIG. 27.

FIG. 33 is a view showing a calculation example of a management difficulty related to an FC path in the example shown in FIG. 27.

FIG. 34 is a schematic diagram showing an overview of usage degree calculating processing in the storage system 1.

FIG. 35 is a schematic diagram showing an overview of cache DB update processing in the storage system 1.

FIG. 36 is a schematic diagram showing an overview of reference request processing from the management terminal 600 in the storage system 1.

FIG. 37 is a schematic diagram showing an overview of file sharing environment moving processing in the storage system 1.

FIG. 38 is a view showing a configuration example of network sharing in a plurality of file sharing environments.

FIG. 39 is a view showing a setting example of a conditional expression according to the embodiment of the present invention.

FIG. 40 is a view showing a setting example of an action list according to the embodiment of the present invention.

FIG. 41 is a view showing a setting example of a priority management object list according to the embodiment of the present invention.

FIG. 42 is a schematic diagram showing a setting example of a reference value according to the embodiment of the present invention.

FIG. 43 is a flowchart showing an example of a file sharing environment simplification processing flow according to the embodiment of the present invention.

DESCRIPTION OF EMBODIMENTS

An embodiment of the present invention will be described with reference to the drawings. Note that the same numerals are given to the same elements, and the description thereof will be omitted.

<<Configuration of Storage System 1 According to the Present Embodiment>>

Firstly, a configuration example of a storage system 1 according to an embodiment of the present invention will be described. FIG. 1 is a diagram showing a configuration example of the storage system 1 according to this embodiment. The storage system 1 according to this embodiment includes NASs 100 (storage control devices), external storage apparatuses (hereinafter simply referred to as "storage apparatuses") 200, FC switches 300, clients 400 (computers), a management server 500, and a management terminal 600.

The NASs 100, the clients 400, the management server 500, and the management terminal 600 are coupled in a mutually communicable manner via a communication network 700 (first communication network). The communication network 700 is, for example, a LAN (Local Area Network) that enables communications by a TCP/IP protocol or appropriate communication networks including the Internet.

Meanwhile, the NASs 100 and the storage apparatuses 200 are coupled in a mutually communicable manner via the plurality of FC switches 300 by a communication network (second communication network) that enables communications by an FC protocol. The communication network 700 is mainly used for transmission and reception of a data write request and a data read request per file unit between each of the clients 400 and each of the NASs 100, and for management data transmission and reception among the management server 500, the management terminal 600, and each of the NASs 100.

The communication network between each of the NASs 100 and the storage apparatuses 200 via the FC switches 300 is used for data write/read processing between each of the NASs 100 and the storage apparatuses 200 under the control of a file system and a virtual NAS manager mounted on each of the NASs 100, as will be described later.

The NAS 100, the client 400, the management server 500, and the management terminal 600 are computers with interfaces communicating with the communication network 700, and an example of the hardware configuration thereof is shown in FIG. 2.

A computer 10 includes a central processor 11 (for example, CPU (Central Processing Unit) or MPU (Micro Processing Unit), hereinafter, simply referred to as "CPU"), a main memory 12 (for example, RAM (Random Access Memory) or ROM (Read Only Memory)), a secondary storage 13 (for example, HDD (Hard Disk Drive)), an input device 14 (for example, a keyboard or a mouse) that receives an operation input from a user, an output device 15 (for example, a liquid crystal monitor), and a communication interface 16 (for example, NIC (Network Interface Card) or HBA (Host Bus Adapter)) that enables communications with other devices. These components are communicably coupled to one another via an internal communication path 17.

In the NAS 100, the secondary storage 13 functions as a physical storage device that provides a local logical storage area where a file system is created and operated.

The operating system ("OS") operated in the computer 10 is not limited to the specific system. For example, Windows (registered trademark) and a UNIX-based operating system, and Linux is preferably used as the OS (UNIX and Linux are registered trademarks). Furthermore, as will be described later, a virtualization mechanism for creating a virtual NAS that is provided to the client 400 is mounted on the NAS 100.

Meanwhile, the storage apparatus 200 accommodates a physical storage device that generates a data storage area to be provided to the client 400 under the control by a file system of each of the NASs 100 and a virtual NAS manager, which will be described later. FIG. 3 shows an example of a hardware configuration of the storage apparatus 200. The storage apparatus 200 includes a plurality of HDDs 210 as physical storage devices, a disk adaptor (DKA) 240 that organizes a logical storage device as a data storage area from the plurality of HDDs 210, a disk controller (DKC) 230 that controls input/output of data to the HDDs 210, and a channel adaptor (CHA) 220 that performs a data communication control between the storage apparatus 200 and the communication network including the FC switch 300.

In this embodiment, other storage devices, for example, a semiconductor storage device (SSD) can be employed as a physical storage device structured by the HDDs 210. Furthermore, a configuration can be employed in which other storage apparatuses are externally coupled to the storage apparatus 200 so that the storage area can be expanded.

<<Configuration of Software>>

Next, a configuration of software of each component included in the system 1 will be sequentially described.

<NAS 100>

First, the NAS 100 according to this embodiment will be described. FIG. 4 shows a software configuration example of the NAS 100. An OS 110 and a virtual NAS manager 120 are mounted on the NAS 100. As the OS 110, Linux-based Debian is preferably employed, for example (Linux and Debian are registered trademarks). However, the OS 110 is not limited to the specific OSs including the Debian. The virtual NAS manager 120 provides and manages a virtualization NAS environment that is realized by virtualization software operating on the OS 110. As the virtualization software, VMWare (registered trademark) is preferably employed, for example. However, the virtualization software is not limited to the specific virtualization software including the VMWare.

In the NAS 100 according to this embodiment shown in FIG. 4, two virtual NASs 100A and 100B are constructed and operated by the virtual NAS manager 120. The clients 400 and the management server 500 that are coupled to the NAS 100 via the communication network 700 can execute data I/O from and to the virtual NASs 100A and 100B as if the virtual NASs 100A and 100B were separate physical NASs. Furthermore, although two groups of the virtual NASs 100A and 100B are constructed on the one physical NAS in the embodiment shown in FIG. 4, the number of the virtual NASs to be operated may be three pairs or more within the range allowed by the resources of the physical NAS 100.

A file system 130, a file sharing part 140, an access request accepting part 150, a management difficulty calculating part 160, and a management table storing area 170 are mounted on each of the virtual NASs 100A and 100B in FIG. 4. The file system 130 is software that stores data per file unit in the logical storage area provided by the HDD 210 in the storage apparatus 200. The file system 130 constructs a file system structure including publicly known elements such as a super-block, a directory entry, an i-node table, and a data block, in the logical storage area of the storage apparatus 200.

The file sharing part 140 is software that enables file sharing among the plurality of clients 400 coupled to the physical NASs 100 via the communication network 700, through a communication protocol, such as a CIFS (Common Internet File System), an NFS (Network File System).

The access request accepting part 150 accepts an access request (data I/O) from the plurality of clients 400 coupled to the physical NASs 100 via the communication network 700, and transfers the data I/O to the predetermined storage apparatus 200 via the communication network including the FC switches 300.

The management difficulty calculating part 160 is a function block that implements one of the main functions in the present invention, and calculates by quantifying the management difficulty that is an index showing the difficulty on the system management related to the virtual NAS 100A and virtual NAS 100B in which the management difficulty calculating part 160 operates, based on data items recorded on various management tables which will be described later. The concept and the concrete calculating procedure of the management difficulty will be described later with reference to the related processing flows and management tables.

The management table storing area 170 stores the various management tables that are referred to by the management difficulty calculating part 160 or the like. FIG. 8 shows one configuration example of the management table storing area 170 according to this embodiment. The management table storing area 170 stores an environment management table 171, a link aggregation management table 172, a file sharing management table 173, a file system management table 174, a backup management table 175, a logical volume management table 176, an FC path management table 177, and an access log 178. These management tables will be described later in relation to the management difficulty calculating processing or the like.

The virtual NAS manager 120, the file system 130, the file sharing part 140, the access request accepting part 150, and the management difficulty calculating part 160, which are described with respect to the NAS 100, are computer programs to implement the respective functions. These computer programs are stored in the secondary storage 13 in the computer 10 shown in FIG. 2 for example, and are read and executed on the main memory 12 by the CPU 11. Furthermore, the management table stores in the management table storing area 170 are stored in the secondary storage 13 included in the computer 10, are read on the main memory 12 by the CPU 11, and are referred to by the various programs as required, in the same manner as the above. The OS 110 is stored in an OS-LU 265 provided in the storage apparatus 200 in this embodiment, as will be described later.

<Storage Apparatus 200>

Next, a software configuration of the storage apparatus 200 will be described. FIG. 5 shows an example of a software configuration of the storage apparatus 200 according to this embodiment. In the example shown in FIG. 5, an RAID controller 261, a replication manager 262, and a data I/O part 263 are mounted on the storage apparatus 200. These are function blocks that implement the respective functions. These are substantially computer programs stored in a program memory (not shown) in the DKC 230 (FIG. 3) that is provided in the storage apparatus 200 as hardware, and are read and executed by a CPU of the DKC 230.

The RAID controller 261 functions to organize the logical storage device with a predetermined RAID group (for example, RAID level 5) from the physical storage device including the plurality of HDDs 210 provided in the storage apparatus 200. The replication manager 262 performs a replication processing control between a logical volume (Logical Unit, hereinafter, referred to as "LU") formed by the logical storage device and other LUs. The replication processing control contains snapshot processing that sequentially creates copies of a certain LU with predetermined intervals, remote copy processing that performs a copy operation to another LU in the storage apparatus 200 different from the storage apparatus 200 to which one LU belongs, or the like.

The data I/O part 263 executes a data write/read to and from a predetermined LU in accordance with a data write/read request received from the NAS 100.

User LUs 264 and OS-LUs 265 are created and operated in the storage apparatus 200 as the above-mentioned LU. The user LU 264 is a unit logical storage area where the file system 130 operating in the NAS 100 (the virtual NASs 100A and 100B) is used as a storage area of data based on the data I/O from the client 400. Furthermore, the OS-LU 265 is a unit logical storage area used as a storage area for system software such as the OS 110 that operates in the NAS 100 or the like, as described above.

In addition, the OS 110 can be stored in the secondary storage 13 provided in the computer 10 as the NAS 100, and the OS-LU 265 is not necessarily provided in the storage apparatus 200. In this embodiment, the user LUs 264 and the OS-LUs 265 are provided to the corresponding clients 400 that operates while being coupled to the system 1. However, the user LUs 264 and the OS-LUs 265 does not need to perfectly correspond to the clients 400.

<Management Server 500>

Next, a software configuration of the management server 500 will be described. FIG. 6 shows an example of a software configuration of the management server 500 according to this embodiment. As shown in FIG. 6, the management server 500 includes an OS 510, a data I/O part 520, a data manager 530, a GUI manager 540, an application 550, a cache database (hereinafter, referred to as "cache DB") 560, a management object storing area 570, and a reference file storing area 580.

The OS 510 is not limited to the specific OSs. Appropriate software including Windows (registered trademark) and Linux (registered trademark)-like open software can be employed as the OS 510. The data I/O part 520 is a function block that manages input/output of data between the NAS 100 and the management terminal 600 that are coupled to the management server 500 via the communication network 700 and the OS 510.

The data manager 530 is a function block that implements the main functions provided with the storage management system according to the present invention, and further includes an average maintenance interval calculating part 531 and a file sharing environment usage degree calculating part 532. The concrete contents of data processing by these parts will be described later with reference to the typical processing flow.

The GUI manager 540 performs processing of receiving a processing command transmitted to the management server 500 from the management terminal 600 to which the management server 500 is coupled via the communication network 700, and of transferring the received processing command to the data manager 530. Furthermore, the GUI manager 540 performs processing of receiving data, from the data manager 530, of the executed result acquired by executing the processing command from the management terminal 600 in the data manager 530, and of transferring the data to the management terminal 600. In this embodiment, the GUI manager 540 and the management terminal 600 are coupled to each other via the communication network 700 configured as the LAN, and the data transfer between the GUI manager 540 and the management terminal 600 is carried out by an HTTP (HyperText Transfer Protocol), for example.

The application 550 is a function block mounted to execute general data processing by a computer, such as text processing, in addition to implementing the function in the present invention, and can store appropriate computer programs as required.

The cache DB 560 stores data related to a setting status of the file sharing environment in the NAS 100. The data is acquired and kept by the request from the management terminal 600 or every predetermined interval set in advance.

The management object storing area 570 is determined as will be described later. The management object storing area 570 keeps a mapping between the file sharing environments set in the NAS 100 and management execution contents (hereinafter, referred to as "actions") that respectively correspond to the file sharing environments.

The reference file storing area 580 stores a reference file to which the data manager 530 refers to when executing the data processing, and an example of the configuration thereof is shown in FIG. 9. In the example shown in FIG. 9, the reference file storing area 580 keeps an operation log 581, an action list 582, and a conditional expression 583. The details of these reference files will be described later in relation to the data processing in the data manager 530.

<Client 400 and Management Terminal 600>

Next, a software configuration of the client 400 and the management terminal 600 will be described. FIG. 7 shows an example of the software configuration of the client 400 and the management terminal 600. The client 400 and the management terminal 600 include an OS 410, an OS 610, a data I/O part 420, an data I/O part 620, an application 430, an application 630, and a Web browser 440, a Web browser 640, respectively.

The OS 410, the OS 610, the data I/O part 420, and the data I/O part 620 are software that manages a hardware control and a data input/output in the client 400 and the management terminal 600 as computers, in the same manner as the management server 500 described above. The application 430 and the application 630 are appropriate application programs that are operated on the OS 410 and the OS 610, such as word processor software for processing a text. The Web browser 440 and the Web browser 640 are software that executes data communication with the GUI manager 540 in the management server 500 on the HTTP basis via the communication network 700, and can utilize various browser software including Windows base software and the open source software. In the management terminal 600, an operation command can be transmitted to the management server 500, and various data can be acquired from the management server 500 and the NAS 100 and the display processing can be executed, by using the Web browser 640.

<Explanations of Reference File and Management Table>

Next, the reference file and the management table by the above-mentioned management server 500 will be sequentially described with reference to configuration examples thereof.

Operation Log 1000 (581)

In an operation log 1000, the data manager 530 in the management server 500 records the contents of the operation executed by a system administrator or the like from the management terminal 600 to each of the virtual NASs 100A and 100B, and keeps the contents in the management table storing area 170 in chronological order. FIG. 10 shows an example of the operation log 1000. The operation log 1000 keeps each of the items: a date and time 1010 that shows time data of when the operation to the NAS 100 is executed; an operation 1020 that shows the contents of the operation executed to the NAS 100; an operation object 1030 that identifies the file sharing environment on which the operation is performed; and an operator name 1040 that identifies a system administrator or the like who executes the operation.

For example, the contents that are recorded on a head record in FIG. 10 show the operation of "creating a file system" is executed to a file sharing environment "env-02" by an operator "user-01", "at 10:15:00 a.m. on May 14, 2009". The operation log 1000 will be described later, and is utilized to calculate an "average maintenance interval" that is an index showing how often the maintenance work is carried out on a certain file sharing environment by an administrator.

Access Log 1100 (178)

An access log 1100 is an access record from the client 400 to a file kept in each of the virtual NASs 100A and 100B. The data manager 530 in the management server 500 acquires the access record from each of the virtual NASs 100A and 100B, and keeps the access record in the reference file storing area 580. FIG. 11 shows an example of the access log 1100. The access log 1100 keeps each of the following items: a date and time 1110 that shows the time when the file provided by each of the virtual NASs 100A and 100B is accessed; a file path name 1120 that shows the location of the file thus accessed; an operation 1130 that shows the contents of the operation executed to the file; and a user name 1040 that identifies a user who has accessed the file.

For example, the contents recorded on the first record in FIG. 11 shows the operation of "Read" is executed to a file identified by a path "/File-1.txt" by a user "user-01", "at 10:15:00 a.m. on May 14, 2009". The access log 1100 will be described later, and is utilized to calculate a "file sharing environment usage degree" that is an index showing the scale of usage degree by the user for the file sharing environment provided by the NAS 100.

Environment Management Table 1200 (171)

An environment management table 1200 shows in a list form the elements included in each of the file sharing environments provided to a user. FIG. 12 shows an example of the environment management table 1200. Note that a code such as the "environment management table 1200" is given to each of the management tables when indicating a single management table as such.

The environment management table 1200 records a management status of each of items: a file sharing environment name 1210 that identifies a file sharing environment to be applied; a virtual NAS name 1220 that is an identifier to identify the virtual NAS providing the file sharing environment; a network 1230 that shows whether a communication network via an FC switch is included in the file sharing environment; a file share 1240 that shows whether a file sharing program with which a plurality of users can share a file is included; a file system 1250 that shows whether a file system with which a user can manage data per file unit is operated; a backup 1260 that shows whether a backup of data stored in the logical volume is set in the file sharing environment; a logical volume 1270 that shows whether a logical volume is included in the file sharing environment; and an FC path 1280 that shows whether an FC path containing an FC switch is included in the file sharing environment.

For each of the items of the network 1230 to the FC path 1280, a record of "1" indicates that an element identified by the item is included in the corresponding file sharing environment. For example, in the example shown in FIG. 12, the second record shows that, with respect to a file sharing environment having the file sharing environment name 1210 of "env-02", the virtual NAS name 1220 of the virtual NAS that provides the file sharing environment is "vnas-02", and the network 1230, the file share 1240, and the file system 1250 that are items with "1" being recorded thereon as data are provided as configuration elements.

Note that, "0" in the backup 1260 shows that a setting of a backup of the stored data is not provided in the file sharing environment "vnas-02", and "0" in the logical volume 1270 and the FC path 1280 shows that the logical volume that is a logical storage area provided by an external storage apparatus is not used via an FC path.

Link Aggregation Management Table 1300 (172)

Next, a link aggregation management table 1300 will be described. FIG. 13 shows an example of the link aggregation management table 1300.

The link aggregation management table 1300 shows a state of a physical resource used by the communication network 700 that is provided among each of the virtual NASs 100A and 100B, the management server 500, and the clients 400. The following items are recorded in the link aggregation management table 1300 shown in FIG. 13 in association with a file sharing environment name 1350 that is given to the corresponding file sharing environment: an IP address 1310 that shows an IP address allocated to each of the virtual NASs 100A and 100B on the communication network 700, a link aggregation device name 1320 that shows a name of a link aggregation device configured as an assembly of physical resources used for the IP address; a physical device number 1330 that shows the number of network ports used for the IP address; and a physical device name 1340 that shows a name of a physical device (physical network, Ethernet (registered trademark) in the present example) used for the IP address 1310.

The first record shown in FIG. 13 as an example shows that, with respect to a file sharing environment in which a file sharing environment name is identified as "env-01", an IP address "192.168.100.1" is allocated, and a communication network environment that couples to the IP address 1310 includes communication network having three physical devices of "eth1, eth2, and eth3" and identified by the link aggregation device name of "env-01". In other words, it is indicated that the communication network that couples to the IP address "192.168.100.1" is configured as a physically triple redundant system.

File Sharing Management Table 1400 (173)

Next, a file sharing management table 1400 will be described. FIG. 14 shows an example of the file sharing management table 1400.

The following items are recorded in the file sharing management table 1400 in association with a file sharing environment name 1460 that is given to the corresponding file sharing environment: a file share name 1410 that shows a name of a file sharing program operated in the file sharing environment; a file system name 1420 that shows a name of a file system operated in the file sharing environment; a protocol 1430 that identifies types of communication protocols used in the file sharing environment; a set ACL number 1440 that shows the number of access control lists (hereinafter, referred to as "ACL") set to the respective sharing files in the file sharing environment; and a set ACE number 1450 that shows the number of access control entries (hereinafter, referred to as "ACE") set to the respective sharing files in the file sharing environment.

The first record shown in FIG. 14 as an example records that, with respect to a file sharing environment of "env-01", a file sharing program and a file system that are identified by the names of "File Share-01" and "FS-1" are operated, and two types of protocols of CIFS and NFS are used. Furthermore, the example of the first record shown in FIG. 14 indicates that, in the file sharing environment, four ACLs that show an access right to each of the sharing files are set, and each of the ACLs includes eight ACEs.

File System Management Table 1500 (174)

Next, a file system management table 1500 will be described. FIG. 15 shows an example of the file system management table 1500.

The following items are recorded in the file system management table 1500 in association with each other: a logical volume name (file system name) 1510 that is a file system name identical with that in the file sharing management table 1400 and a name of a logical volume as a logical storage area used by the file system; a user name 1520 that shows a name of a user who utilizes the file system identified by the file system name 1510, and a quota limitation system 1530 that shows types of quota limitations imposed on the respective users identified by the user name 1520. The file system management table 1500 identifies the user who utilizes the respective file systems operated in the virtual NASs 100A and 100B, and records the limitation items imposed with regard to the logical volume utilized by each of the users via the file system, as the quota limitation system 1530.

The first record shown in FIG. 15 as an example shows that users "User01" and "User02" share a file system called as "FS-1" that utilizes a logical volume "LV-01" as a logical storage area, and "limitation on the number of blocks and the number of files" and "limitation on the number of files" are imposed on the users "User01" and "User02" respectively when the users "User01" and "User02" use the logical volume "LV-01". Other indexes, such as limitation on the storage capacity itself of the stored data, may be imposed as a quota limitation system, in addition to the exemplified limitation on the number of blocks and the number of files.

Backup Management Table 1600 (175)

Next, a backup management table 1600 will be described. FIG. 16 shows an example of the backup management table 1600.

The backup management table 1600 shows types of data backup systems that are applied to the respective file systems that are operated in the virtual NASs 100A and 100B. In the example shown in FIG. 16, the following items are recorded in association with each other in the backup management table 1600: a file system name 1610 that shows a name identifying a file system, backup means 1620 that shows a backup method set for the corresponding file system, and a backup destination 1630 that shows a backup destination of the backup of data executed by the backup means 1620. An example of the first record shown in FIG. 16 shows that, with respect to a file system of "FS-1", "snapshot processing" that creates a copy of the logical volume ("LV-01" if referring to FIG. 15) used at regular time intervals is set as the backup means 1620, and the backup destination is a physical storage device ("remote") different from the physical storage device in the storage in which the logical volume "LV-01" is created.

Note that, if "local" is recorded in the backup destination 1630, a data copy by the backup processing is created in any of storage media ("tape" in the second record shown in FIG. 16 as an example) provided in the same virtual NAS 100 as the virtual NAS 100 to which the file system belongs.

Logical Volume Management Table 1700 (176)

Next, a logical volume management table 1700 will be described. FIG. 17 shows an example of the logical volume management table 1700. The logical volume management table 1700 is a table in which the configuration and the use status of the logical volume that is a logical storage area used by the file system operated in the virtual NASs 100A and 100B are recorded.

In the example shown in FIG. 17, the following items are recorded in association with each other in the logical volume management table 1700: a logical volume name 1710 that shows a name of each of the logical volumes, an LU number 1720 that shows the number of logical units included in the corresponding logical volume, LU identification information 1730 that is an identification code given to mutually identify the LUs, and a count of addition 1740 that shows how many times the LU as a unit logical storage area is added to the logical volume from the time when the logical volume is created at first.

The first record shown in FIG. 17 as an example shows that a logical volume called "LV-01" includes four LUs having the names of "LU1 to LU4", and an LU is added twice since the logical volume has created.

FC Path Management Table 1800 (177)

Next, an FC path management table 1800 will be described. FIG. 18 shows an example of the FC path management table 1800. In the FC path management table 1800, the configuration of an FC Path is recorded. The FC path is a communication path provided by an FC network coupling the physical NASs 100, the virtual NASs 100A and 100B constructed thereon, and the storage apparatus 200.

In the example shown in FIG. 18, the following items are recorded in the FC path management table 1800 in association with a corresponding file sharing environment name 1850: a path name 1810 that shows a name of each of the set FC paths, a host WWN (World Wide Name) 1820 and an array WWN 1830 that show an address at the virtual NAS 100 side and an address at the storage apparatus 200 side, respectively in the FC path identified by the corresponding path name 1810, and an accessible LU 1840 that shows an LU accessible from the virtual NASs 100A and 100B via the respective FC paths.

The first record shown in FIG. 18 as an example shows that, with respect to a file sharing environment "env-01", a set FC path is "FC-01", an address at the virtual NAS 100 side and an address at the storage apparatus 200 side are "10:00:00:22:33:00:55:61" and "20:00:00:12:40:00:11:99", respectively, and this FC path enables the corresponding virtual NAS to access the LUs identified as "LU1 to LU4".

<<Explanation of Data Processing in the Present System>>

Next, under the condition of the configuration of the present system 1 described above, data processing executed in the present system 1 will be described. FIG. 19 is a diagram schematically showing a data flow in the present system 1. The configuration shown in FIG. 19 is an overview of a system configuration diagram in which the items related to the explanation of the data flow are extracted and reconstructed from the present system 1 and the configuration elements thereof shown in FIGS. 1 to 9. The broken lines and the dotted lines having arrows in the drawing show paths and directions of the data flow in the configuration shown in FIG. 19.

As shown in FIG. 19, an operation command from the management terminal 600 to the management server 500 is transmitted from the Web browser 640 operated in the management terminal 600 to the GUI manager 540 mounted on the management server 500 via the communication network 700. The GUI manager 540 transfers the operation command received from the management terminal 600 to the data manager 530. The data manager 530 analyzes the received operation command, and transfers an execution command corresponding to the operation command to the access request accepting part 150 mounted on each of the virtual NASs 100A and 100B to be an object of the operation command, as will be described later, via the communication network 700, and makes the access request accepting part 150 execute the contents thereof.

FIG. 20 shows an example of a data processing flow when a read request or a write request of data is transmitted from the client 400 to the access request accepting part 150 mounted on each of the virtual NASs 100A and 100B. As shown in FIG. 19 with the dotted lines, the read request or the write request from the client 400 is transmitted from the Web browser 440 operated in the client 400 to the access request accepting part 150 mounted on each of the virtual NASs 100A and 100B via the communication network 700, and the access request accepting part 150 executes the processing shown in FIG. 20.

Firstly, the access request accepting part 150 that has received an access request determines whether the access request is a read request of a file (S2001). If determining that the access request is the read request (S2001: Yes), the access request accepting part 150 reads a file related to the read request from the file system in the virtual NAS 100A or 100B to which the access request accepting part 150 belongs, and transmits the file to the client 400 that is a request source via the communication network 700 (S2002). If determining that the received access request is not the read request (S2001: No), the access request accepting part 150 determines whether the received access request is a write request (S2003).

If determining that the access request is the write request (S2003: Yes), the access request accepting part 150 commands the file system in the virtual NAS 100A or 100B to which the access request accepting part 150 belongs to execute the write processing to the file related to the write request (S2004). If determining that the received access request is not the write request (S2003: No), the access request accepting part 150 terminates the processing without doing anything.

The client 400 that uses the virtual NASs 100A and 100B for data storage executes the above-mentioned processing related to FIG. 20. The processing is common read or write processing of a file, and therefore the detailed explanation thereof is omitted here.

<Data Processing in Management Server 500>

Data Processing by GUI Manager 540

Next, data processing executed in the management server 500 will be sequentially described. Firstly, data processing executed by the GUI manager 540 mounted on the management server 500 will be described.

FIG. 21 shows an example of a data processing flow executed by the GUI manager 540. In the data processing shown in FIG. 21, the GUI manager 540 executes predetermined data processing in accordance with the operation command inputted by a user via the management terminal 600 or various execution conditions that are stored in the management server 500 in advance by a manual setting or the like before the operation of the system 1 starts.

Firstly, the GUI manager 540 reads a priority management object list 571 stored in the management object storing area 570 and the action list 582 (processing content keeping part) stored in the reference file storing area 580 via the data manager 530 (S2101).

FIG. 40 shows an example of the action list 582, and FIG. 41 shows an example of the priority management object list 571.

The action list 582 includes execution conditions set for the case where the management server 500 executes the operation determined in advance under the system design condition. In the example shown in FIG. 40, the action list 582 is a text file that stores the operation by the management server 500 and the corresponding execution condition in combination with each other. In the example shown in FIG. 40, nine-step actions of an action 1 to an action 9 are set depending on a level of the processing to be executed.

In the case of the action 1 that is the highest level, three types of operations are defined. The operations include an operation in which the data manager 530 updates the cache DB 560 when a system administrator issues an operation command via the management terminal 600 or every other hour from the time when the system operation is started, an operation in which the GUI manager 540 issues a warning to the system administrator via the management terminal 600 every half hour from the time when the system operation is started, and an operation in which the virtual NASs 100A and 100B are allowed to move.

The update processing by the cache DB 560 is processing that the recorded contents of the management tables in the virtual NASs 100A and 100B describe above are acquired, and are made to reflect to the management tables stored in the cache DB 560. In this embodiment, the virtual NASs 100A and 100B, to be described later, that provide the file sharing environment considered to have the higher difficulty in system management are made to execute the update processing of the cache DB 560 with shorter intervals so that the operation statuses of the file sharing environments can be obtained more correctly.

Issuing the warnings with intervals is processing that the warnings are issued to the system administrator from the management terminal 600 by using display information or the like with shorter intervals regarding the file sharing environment considered to have the higher difficulty in the system management, in order to, for example, notify the system administrator of the priority at which the file sharing environment is ranked in the system management as described above.

The "movement of the virtual NASs 100A and 100B" indicates processing in which a part of the virtual NASs 100A and 100B is moved from a specific physical NAS 100 determined to have a large load caused by the associated virtual NASs 100A and 100B to another physical NAS 100, in order to level a load among a plurality of physical NASs 100. The movement processing of the virtual NASs 100A and 100B will be described later.

In a setting example of the action list shown in FIG. 40, processing defined in the "action 1" is allocated to the file sharing environment that is determined to have the highest management difficulty. As the management difficulty decreases, an action 2, an action 3, and the like are sequentially allocated to the file sharing environment to be managed. In the example shown in FIG. 40, it is defined that, in the file sharing environment to which an action 9 is allocated, the update processing by the cache DB 560 is executed only in the case of the instruction of the system administrator and the warning via the management terminal 600 is not issued. Accordingly, the file sharing environment to which the action 9 is allocated is placed out of management actually.

The priority management object list 571 exemplified in FIG. 41 is a text file in which applied action names that show the names of actions listed in FIG. 40 and respectively allocated to file sharing environments are recorded in association with the file sharing environment names that identify the file sharing environments. In FIG. 41, for example, the action 1 is set as an action that is applied to a file sharing environment "env-01". Therefore, in this case, the file sharing environment "env-01" is determined to have the highest management difficulty.

Note that, the action list 582 and the priority management object list 571 are each created as a text file, however, may be configured as a table. Furthermore, the form of describing the contents that define the processing may be changed as required.

Referring back to the processing flow by the GUI manager 540 shown in FIG. 21, the GUI manager 540 continuously monitors whether an event defined in advance occurs during the operation of the system 1 in S2101 (S2102: No). The monitoring of the event is achieved in such a manner that the GUI manager 540 monitors an access request reception from the management terminal 600 and determines whether the timing of executing any one of the cache DB update processing and the warning issue processing that are defined in the priority management object list 571 and the action list 582 has arrived, using the timer counter in the GUI manager 540, for every file sharing environment recorded in the management tables.

If detecting the occurrence of an event (S2102: Yes), the GUI manager 540 determines whether the event is an access request from the management terminal 600 (S2103). If determining that the event is an access request (S2103: Yes), the GUI manager 540 executes access request acceptance processing, which will be described later (S2104).

If determining that the event is not an access request (S2103: No), the GUI manager 540 further determines whether the event indicates that the timing of executing the cache DB update processing has arrived (S2105). If determining that the timing of executing the cache DB update processing has arrived (S2105: Yes), the GUI manager 540 makes the data manager 530 acquire the recorded contents of the management tables recorded in the virtual NASs 100A and 100B from the virtual NASs 100A and 100B that provide the file sharing environment in which the cache DB update processing timing has arrived, and update the contents of the cache DB 560 (S2106)

If determining that the timing of executing the cache DB update processing has not arrived (S2105: No), the GUI manager 540 further determines whether the event indicates that the warning issue timing to the system administrator has arrived (S2107). If determining that the warning issue timing has arrived (S2107: Yes), the GUI manager 540 transmits warning information to the Web browser 640 in the management terminal 600 via the communication network 700 and makes the Web browser 640 execute processing such as the display of a warning screen or the like (S2108). Note that, the GUI manager 540 creates the warning information as an HTML file of an appropriate form.

If determining that the warning issue timing has not arrived (S2107: No), the GUI manager 540 further determines whether the timing of the cache DB update processing for the file sharing environment unrecorded in the priority management object list 571 has arrived (S2109). If determining that the timing of the cache DB update processing has arrived (S2109: Yes), the GUI manager 540 refers to the priority management object list 571 and the environment management table 1200 (FIG. 12), instructs the virtual NASs 100A and 100B that provide the file sharing environment that is not recorded in the priority management object list 571 to acquire the recorded contents of the management tables from the data manager 530, and to update the contents of the cache DB 560 (S2110).

If determining that the timing of the cache DB update processing has not arrived (S2109: No), the GUI manager 540 terminates the processing.

As described above, the management server 500 in the present system 1 can update the contents of the management tables used for management of the respective file sharing environments on a timely basis depending on the priority in the management of the respective file sharing environments set in advance by the GUI manager 540 (processing content executing part) mounted thereon, and can issue a warning to the system administrator on a timely basis.

Access Request Acceptance Processing S2104

Next, the access request acceptance processing S2104 included in the processing flow by the GUI manager 540 shown in FIG. 21 will be described in more details. FIG. 22 shows an example of the access request acceptance processing flow executed by the GUI manager 540. In the access request acceptance processing, the GUI manager 540 analyzes the access request received from the management terminal 600, and executes the processing in accordance with the contents thereof.

Firstly, the GUI manager 540 receives an access request from the Web browser 640 in the management terminal 600 via the communication network 700 (S2201). Successively, the GUI manager 540 determines a type of requests included in the received access request (S2202). If determining that the received access request is a request for processing of "updating the management table and the cache DB" (S2202: update), the GUI manager 540 makes the data manager 530 acquire the recorded contents of the management tables from the virtual NASs 100A and 100B that provide the file sharing environment corresponding to the access request and execute update processing of the cache DB 560 using the recorded contents of the management tables thus acquired, and moves the processing to S2206 (S2203).

On the other hand, if determining that the received access request received in S2202 is "refer data" (S2202: referring), the GUI manager 540 refers to the priority management object list 571 and determines whether the file sharing environment is registered in the list (S2204). If determining that the file sharing environment is registered (S2204: Yes), the GUI manager 540 makes the data manager 530 acquire the recorded contents of the management tables from the virtual NASs 100A and 100B that provide the registered file sharing environments and update the content of the cache DB 560 using the recorded contents thus acquired (S2205). FIG. 36 shows an overview of a data flow in the system 1 when the GUI manager 540 processes the access request related to the referring from the management terminal 600.

Successively, the GUI manager 540 acquires the information that is requested to acquire by the access request from the updated recorded contents of the cache DB 560 (S2206). Note that, the access request received from the management terminal 600 may use any format. For example, as described above, the format may include "whether the requested contents are updating or referring of data", "identification of a file sharing environment that is a target of the request", and "kinds of data to be referred (for example, the recorded contents in the link aggregation management table 1300 exemplified in FIG. 13)".

Next, the GUI manager 540 creates screen data that displays the information related to the file sharing environment acquired in S2206 (S2207). In this embodiment, this screen data is an HTML file, for example. On the display screen, the pieces of the acquired file sharing environment information can be displayed in the order registered in the priority management object list 571. In other words, on the priority management object list 571, the information corresponding to the "action 1" considered to have the highest priority is displayed at the head, and the pieces of information corresponding to the "action 2" and the following "actions" are displayed sequentially. In this manner, the information relating to the file sharing environment with the higher failure risk can be referred preferentially.

As a method of preferentially referring the information relating on the file sharing environment that is considered to have the higher failure risk, the following configurations can be applied for example, in addition to the method described above. The configurations include: a configuration in which a screen transit is controlled in such a manner that the information related to other file sharing environments considered to have the relatively lower failure risk cannot be referred without operating the detailed display of the file sharing environment which is considered to have the relatively higher failure risk and which corresponds to the "action 1" for example; and a configuration in which information other than the information corresponding to the file sharing environment with a failure risk is delayed to reflect to the cache DB 560, so that the file sharing environment with a failure risk may receive attention.

Successively, the GUI manager 540 transmits the screen data that has been created in S2207 to the management terminal 600 that is a source of the access request (S2208). The management terminal 600 that has received the screen data can display the display screen using the Web browser 640.

With the configuration described above, the system administrator can refer to the desired data related to the file sharing environment by transmitting an access request from the management terminal 600, and can update the recorded contents of the cache DB 560 at the appropriate timing.

Content of Data Processing in Data Manager 530

Next, the contents of the main data processing executed by the data manager 530 mounted on the management server 500 will be described. FIG. 23 is a flowchart showing an example of a data processing flow executed by the data manager 530.

Firstly, the average maintenance interval calculating part 531 in the data manager 530 refers to the operation log 581 stored in the reference file storing area 580, and calculates an average maintenance interval that is an index showing how often the operation by the system administrator is executed to each of the file sharing environments (S2301). Specifically, the average maintenance interval calculating part 531 examines the operation log 581 in which the operations by the system administrator are recorded in chronological order, and calculates and extracts an average maintenance interval for every file sharing environment. In this embodiment, an average maintenance interval indicates an average value of time intervals of the operations executed to a certain file sharing environment. Applying the index makes it possible to easily obtain the extent of maintenance of each of the file sharing environments by calculation. FIG. 24 shows an overview of a data flow in the storage system 1 when an average maintenance interval is calculated.

For example, in the recorded contents of the operation log 1000 that are exemplified in FIG. 10, average maintenance intervals of the file sharing environments "env-01" and "env-02" obtained by focusing on the date and time 1010 and the operation object 1030 are as follows:

average maintenance interval of the file sharing environment "env-01"=[{11:20:00-11:12:00}+{11:45:00-11:20:00}]/2=(8+25)/2=16.5 minutes; and average maintenance interval of the file sharing environment "env-02"=[{11:18:00-10:15:00}+{11:50:00-11:18:00}]/2=(63+32)/2=47.5 minutes.

Note that, the longer monitor time can be set to obtain an average maintenance interval of each of the file sharing environments, and the above-mentioned expressions can be changed and applied as required.

Next, the data manager 530 instructs each of the virtual NASs 100A and 100B that provide the respective file sharing environments to calculate and transmit a management difficulty (S2302). Specifically, the data manager 530 instructs the management difficulty calculating part 160 that is mounted on each of the virtual NASs 100A and 100B to calculate a management difficulty as will be described later on the basis of the contents recorded in the management table in each of the virtual NASs 100A and 100B to which the management difficulty calculating part 160 belongs, and to return the result, via the communication network 700. FIG. 26 shows an overview of a data flow in the system 1 when the data manager 530 acquires the management difficulty.

In this embodiment, the above-mentioned management difficulty is given as a value in which the difficulty in maintenance of a file sharing environment is quantified. With configuration elements such as a network and a file system that are included in the file sharing environment, the management difficulty aims to quantify and show the difficulty of maintenance due to the less visible configuration elements as the configuration elements advance to physical layers from logical layers, and the difficulty of maintenance due to a setting order, a depth of screen transits, or the like, seen from the system administrator or the like.

A management difficulty is calculated by using the pieces of setting information related to a network, a file system, and a file sharing as shown in the management tables exemplified in FIGS. 13 to 18. The pieces of information are necessary elements for the virtual NASs 100A and 100B that provide the file sharing environment. Accordingly, using the pieces of information makes it possible to obtain characteristics of the virtual NASs 100A and 100B in more multiple aspects, to obtain the operation status of the virtual NASs 100A and 100B with more accuracy, and to execute more appropriate management.

Furthermore, quantification of the management difficulty aims to evaluate a risk when a file sharing environment is managed, and makes it possible to give priority orders by comparing the numeric values. Furthermore, a range of management objects can be specified by setting a threshold value or the like. In addition, showing a numeric value to the system administrator exhibits effects such as a support for determining on the management.

Specifically, a management difficulty in a file sharing environment is calculated by utilizing a size of a redundant configuration and an index of the number of tiers of a setting. In the file sharing environment, as a size of a redundant configuration is larger, the number of resources to be physically used increases. Accordingly, the management becomes more difficult. Furthermore, as the hierarchy of the setting runs deep, the setting itself becomes less visible from the administrator. Accordingly, the management also becomes difficult. In the latter case, when a failure occurs, a cause is searched from the higher tier in order. Accordingly, the hierarchy of the setting running deep causes a problem of taking time to identify a failure.

FIG. 27 is a schematic diagram hierarchically showing the file sharing environments to be managed by the administrator in order to visually show a concept of the management difficulty described above. FIG. 27 is an example of the file sharing environment "env-01" that is registered in the environment management table 1200 in this embodiment. The contents shown in the drawing are indicated by developing the contents that are recorded regarding the file sharing environment "env-01" in the link aggregation management table 1300 (FIG. 13), the file sharing management table 1400 (FIG. 14), the file system management table 1500 (FIG. 15), the backup management table 1600 (FIG. 16), the logical volume management table 1700 (FIG. 17), and the FC path management table 1800 (FIG. 18).

In the schematic diagram, the horizontal axis direction that extends from the left side to the right side in the drawing indicates the direction from the logical layers towards the physical layers. For example, when a plurality of hardware elements are shown as one element by software, as the hierarchy of the file sharing environment progresses to the right side, the number of configurations increases and it becomes difficult for the administrator to obtain the configuration elements. Accordingly, it can be said that the management difficulty becomes high. Furthermore, the vertical axis direction that extends from the upper side to the lower side in the drawing is based on the data flow seen from a user. For example, when a user accesses to the virtual NASs 100A and 100B from the management terminal 600, the user firstly requests an access to the IP address allocated to the virtual NASs 100A and 100B that are access targets. The virtual NASs 100A and 100B that have accepted the access request access a file system, the file system further accesses a logical volume, and so on. Accordingly, it becomes difficult to see the management object as the hierarchy of the file sharing environment progresses from the upstream (IP address) to the downstream (logical volume). In other words, since it becomes difficult to specify a failure when the failure occurs, it can be said that the management difficulty also becomes high.

Calculation of Management Difficulty

Next, by referring to the schematic diagram related to a management difficulty shown in FIG. 27, described is a calculation method of a management difficulty in which a hierarchical structure and a redundant configuration in the file sharing environment are considered. A tier level calculated from the number of tiers of the setting and a redundancy calculated from the number of redundant configurations are used for the calculation of a management difficulty in this embodiment. This indicates that the configurations in the horizontal axis direction are quantified.

For example, a physical device "eth-1" in the item of "1. <Network>" has a tier "3" counted from the left side in the horizontal axis direction in FIG. 27, and therefore the tier level is obtained as "3". As for the redundancy, when an example of physical devices included in a link aggregation of "1. <Network>" is explained, the number of physical devices included in a link aggregation "agr-0" is "3" and the number of physical devices included in a link aggregation "agr-1" is "2". Accordingly, the redundancy is obtained as "5 (=3+2)".

Based on the concept of the tier level and the redundancy described above, the management difficulty is defined in this embodiment as the following expression.

$$\text{the management difficulty of each of the items} = \text{SIGMA}j\ (j*Xj)$$

where "j" represents the tier level in the horizontal axis direction, and "Xj" represents the redundancy at the j-th tier in the horizontal axis direction.

In accordance with the above-mentioned expression, in the schematic diagram shown in FIG. 27, the management difficulty is higher as the hierarchy runs deeper in the vertical axis direction and the configuration is more redundant in the tiers located deep in the hierarchy in the horizontal axis direction. It can be considered that the file sharing environment with such a configuration is difficult to manage.

The management difficulty is derived from the tiers in the vertical axis direction, such as "1. <Network>", "2. <File Sharing>", and the tiers in the horizontal axis direction, such as "IP address" and "link aggregation," as shown in FIG. 27. The number of tiers in the hierarchy increase as the hierarchy runs deep with the upper left point in FIG. 27 set as an origin point, both in the vertical axis direction and in the horizontal axis direction. The calculation examples of the management difficulty related to each of the elements in the example in FIG. 27 will be shown below.

<Network>

Referring to FIGS. 27 and 28, a management difficulty is calculated as follows.

$$\text{address}\ j*Xj=1*1=1$$

$$\text{link aggregation}\ j*Xj=2*2=4$$

$$\text{physical device}\ j*Xj=3*5=15$$

$$\text{management difficulty}=1+4+15=20$$

<Sharing>
Referring to FIGS. 27 and 29, a management difficulty is calculated as follows.

FileShare-01 $j*Xj=1*1=1$

NFS/CIFS $j*Xj=2*2=4$

ACL $j*Xj=3*4=12$

ACE $j*Xj=4*5=20$ management difficulty=1+4+12+20=37

<File System>
Referring to FIGS. 27 and 30, a management difficulty is calculated as follows.

file system $j*Xj=1*1=1$

User ID $j*Xj=2*1=2$

Quota limitation system $j*Xj=3*2=6$ management difficulty=1+2+6=9

<Backup>
Referring to FIGS. 27 and 31, a management difficulty is calculated as follows.

backup $j*Xj=1*1=1$ backup method $j*Xj=2*2=4$ backup destination $j*Xj=3*2=6$ management difficulty=1+4+6=11

<Logical Volume>
Referring to FIGS. 27 and 32, a management difficulty is calculated as follows.

logical volume $j*Xj=1*1=1$ volume usage $j*Xj=2*2=4$

LU $j*Xj=3*4=12$ management difficulty=1+4+12=17

<Path Setting>
Referring to FIGS. 27 and 33, a management difficulty is calculated as follows.

logical FC path $j*Xj=1*1=1$ physical FC path $j*Xj=2*2=4$ management difficulty=1+4=5

In this manner, the total management difficulty in the file sharing environment "env-01" is calculated as follows.

total management difficulty=<Network> management difficulty+<Sharing> management difficulty+ <File System> management difficulty+<Backup> management difficulty+<Logical Volume> management difficulty+<Path Setting> management difficulty=20+37+9+11+17+5=99

<Weighting in Vertical Direction>
With the calculated management difficulty in the file sharing environment "env-01" exemplified in FIG. 27, elements of the management difficulty seen from a user such as a system administrator can be added thereto. The elements include the setting order on the management screen, the number of screen transits before reaching the setting screen, or the like. For example, when a file sharing environment is managed by being displayed on the management screen in the management terminal 600 in a hierarchal tree form as shown in FIG. 27, drawing attention of the system administrator or the like becomes difficult as the hierarchy runs deep from the upper side to the lower side of the screen in the order of <Network>, <File Sharing>, <File System>, <Backup>, <Logical Volume>, and <Path Setting>. As a result, this might prevent the proper management. To reflect such a status to the management difficulty, a management difficulty can be calculated by considering weights as follows.

total management difficulty=<Network> management difficulty*1 (weight)+<Sharing> management difficulty*2 (weight)+<File System> management difficulty*3 (weight)+<Backup> management difficulty*4 (weight)+<Logical Volume> management difficulty*5 (weight)+<Path Setting> management difficulty*6 (weight)=20*1+ 37*2+9*3+11*4+17*5+5*6=20+74+27+44+85+ 30=280

In this manner, reflecting the maintenance difficulties in consideration of the arrangement on the screen and the visibility to the management difficulties makes it possible to perform more appropriate system management.

<Weighting in Horizontal Direction>
It can be considered that the configuration of sharing a physical resource by a plurality of the virtual NASs 100A and 100B that each provide a different file sharing environment is reflected to the above-mentioned management difficulty. FIG. 38 shows a configuration example in which two file sharing environments share a network as a physical resource in association with the link aggregation management table 1300 shown in FIG. 13.

In the example shown in FIG. 38, two file sharing environments "env-01" and "env-02" share a link aggregation device and a physical device. In this case, the occurrence of a failure in the link aggregation device influences the two file sharing environments "env-01" and "env-02". Therefore, reflecting such a status to the management difficulty is preferable. In the case of the example shown in FIG. 38, the two file sharing environments share elements in the <Network>. Accordingly, the total management difficulty can be calculated as follows.

total management difficulty=<Network> management difficulty*2+<Sharing> management difficulty+ <File System> management difficulty+<Backup> management difficulty+<Logical Volume> management difficulty+<Path Setting> management difficulty=20*2+37+5+11+17+5=115

The configuration described above can reflect the configuration of the file sharing environment to the management difficulty more correctly, and thereby can improve the accuracy of the management difficulty.

FIG. 26 schematically shows a data flow in the system 1 when the management difficulty is acquired as described above. The data manager 530 mounted on the management server 500 instructs the management difficulty calculating part 160 mounted on each of the virtual NASs 100A and 100B to calculate a management difficulty in the manner described above and acquires the result thereof via the communication network 700 (the dashed line in the drawing).

FIG. 25 shows an example of a calculation processing flow of a management difficulty executed in the virtual NASs 100A and 100B upon receiving the instruction from the data manager 530.

Firstly, the management difficulty calculating part 160 refers to the environment management table 1200 in the virtual NAS 100A or 100B to which the management difficulty calculating part 160 belongs, searches for and extracts a record in which the file sharing environment name 1210 is recorded, the file sharing environment name 1210 being identical with the name of the file sharing environment provided by the virtual NAS 100A or 100B to which the management difficulty calculating part 160 belongs (S2501).

Next, the management difficulty calculating part 160 determines whether an element in the "network" is set (whether "1" is recorded as the corresponding data) in the record while referring to the extracted record (S2502). If determining that an element in the "network" is set (S2502: Yes), the management difficulty calculating part 160 refers to the link aggregation management table 1300 in the management table storing area 170, and calculates a management difficulty related to the network with the method described above (S2503). If determining that an element in the "network" is not set (S2502: No), the management difficulty calculating part 160 progresses to the processing of S2504.

Next, the management difficulty calculating part 160 determines whether an element in the "file sharing" is set in the record (S2504). If determining that an element in the "file sharing" is set (S2504: Yes), the management difficulty calculating part 160 refers to the file sharing management table 1400 in the management table storing area 170, and calculates a management difficulty related to the file sharing with the method described above (S2505). If determining that an element in the "file sharing" is not set (S2504: No), the management difficulty calculating part 160 progresses to the processing of S2506.

Next, the management difficulty calculating part 160 determines whether an element in the "file system" is set in the record (S2506). If determining that an element in the "file system" is set (S2506: Yes), the management difficulty calculating part 160 refers to the file system management table 1500 in the management table storing area 170, and calculates a management difficulty related to the file system with the method described above (S2507). If determining that an element in the "file system" is not set (S2506: No), the management difficulty calculating part 160 progresses to the processing of S2508.

Next, the management difficulty calculating part 160 determines whether an element in the "backup" is set in the record (S2508). If determining that an element in the "backup" is set (S2508: Yes), the management difficulty calculating part 160 refers to the backup management table 1600 in the management table storing area 170, and calculates a management difficulty related to the backup with the method described above (S2509). If determining that an element in the "backup" is not set (S2508: No), the management difficulty calculating part 160 progresses to the processing of S2510.

Next, the management difficulty calculating part 160 determines whether an element in the "logical volume" is set in the record (S2510). If determining that an element in the "logical volume" is set (S2510: Yes), the management difficulty calculating part 160 refers to the logical volume management table 1700 in the management table storing area 170, and calculates a management difficulty related to the logical volume with the method described above (S2511). If determining that an element in the "logical volume" is not set (S2510: No), the management difficulty calculating part 160 progresses to the processing of S2512.

Next, the management difficulty calculating part 160 determines whether an element in the "FC path" is set in the record (S2512). If determining that an element in the "FC path" is set (S2512: Yes), the management difficulty calculating part 160 refers to the FC path management table 1800 in the management table storing area 170, and calculates a management difficulty related to the FC path with the method described above (S2513). If determining that an element in the "FC path" is not set (S2512: No), the management difficulty calculating part 160 progresses to the processing of S2514.

In S2514, the management difficulty calculating part 160 performs the above-mentioned weighting processing on the management difficulties in the calculation processing of the management difficulty. In other words, the management difficulty calculating part 160 executes the weighting processing related to the depth of a tier seen from a user such as a system administrator, or the weighting processing related to sharing a physical resource (for example, a network) among a plurality of file sharing environments. Successively, the management difficulty calculating part 160 sums up the management difficulties related to the elements that have been calculated in the processing above, transmits the total management difficulty to the data manager 530 in the management server 500, which is the request source via the communication network 700, and terminates the processing.

The explanation of the management difficulty acquiring processing executed in S2302 in the processing flow by the data manager 530 in FIG. 23 is finished here.

Description will be successively given referring back to the processing flow by the data manager 530 shown in FIG. 23. Next, the data manager 530 acquires the access log 1100 (178) stored in the management table storing area 170 in each of the virtual NASs 100A and 100B by use of the file sharing environment usage degree calculating part 532, and calculates a file sharing environment usage degree by a user (hereinafter, merely referred to as "usage degree") of a file sharing environment that each of the virtual NASs 100A and 100B provides (S2303). FIG. 34 shows an overview of a data flow in the system 1 when the data manager 530 acquires the usage degree.

The access log 1100 keeps each of the following items as exemplified in FIG. 11: the date and time 1110 that shows time when the file provided by each of the virtual NASs 100A and 100B is accessed; the file path name 1120 that shows the location of the file thus accessed; the operation 1130 that shows the contents of the operation executed to the file; and the user name 1140 that identifies a user who has accessed the file.

The file sharing environment usage degree calculating part 532 acquires the recorded contents of the access log 1100, calculates the number of users who utilize the file sharing environments from the user name 1140, the number of files that the users utilize from the file path name 1120, and the number of accesses (sum of the number of read operations and the number or write operations) by the users to the files from the operation 1130, thereby quantifying the calculated values as the usage degree of the file sharing environment provided by each of the virtual NASs 100A and 100B. In other words, the usage degree is an index in which an usage degree to a certain file sharing environment by end users (the number of users who utilize (access)) is quantified. In this embodiment, the file sharing environment usage degree calculating part 532 calculates an access frequency from the number of accesses to each of the file sharing environments and the date and time when each access is executed, and derives an influence degree that is the number of users who use the file sharing environments from the record in the user name 1140. The following shows a calculation example of a usage degree in this embodiment.

For example, with respect to a file system included in a file sharing environment that is operated in the certain virtual NASs 100A and 100B, the number of users who use the file system is five, the number of files that are included therein is five, and the number of accesses is 100 times per day, are obtained from the recorded contents of the access log 1100. In this case, the access frequency and the influence degree are calculated as follows.

access frequency=number of accesses*number of files=100*5 influence degree (number of users)=5

Therefore, the usage degree is calculated as follows.

usage degree=access frequency*influence degree=100*5*5=2500

As described above, introducing the concept of the usage degree to each of the file sharing environments makes it possible to quantitatively evaluate the extent of usage of the file sharing environments by the end users.

Next, the data manager 530 collates, for each file sharing environment, the calculated values of the average maintenance interval, the management difficulty, and the usage degree, which are described above, with a conditional expression for selecting a priority management object (hereinafter, referred to as "conditional expression") including reference values that are the bases for determining whether the file sharing environment is selected as a priority management object, and selects an action to be applied to the file sharing environment.

FIG. 39 shows a setting example of a conditional expression according to this embodiment. The conditional expression is a text file that records a conditional expression to be a basis for selecting an action (maintenance content) to be allocated to the file sharing environment and the action corresponding to the conditional expression, on the basis of the average maintenance interval, the management difficulty, and the usage degree that are calculated in the file sharing environment. In this embodiment, reference values of the average maintenance interval, the management difficulty, and the usage degree are set for the conditional expression, and the conditional expressions are set by using the reference values as exemplified in FIG. 39. The reference values are values of the average maintenance interval, the management difficulty, and the usage degree that are calculated based on the system configuration determined to be required on the system operation by the system administrator and the number of users and the number of accesses that are expected on the operation.

In this embodiment, the reference values of the average maintenance interval, the management difficulty, and the usage degree are set below respectively, for example. However, the setting examples may not be used as the reference values, and other appropriately selected reference values can be used. Furthermore, the numerical ranges of the average maintenance interval, the management difficulty, and the usage degree may be defined directly in the conditional expressions, without using the reference values.

The reference value of the average maintenance interval: 24 hours*3 days=72 hours is set as a reference value, using a state of no operation on the file sharing environment in three days as a reference.

The reference value of the management difficulty: FIG. 42 shows a minimum configuration example of a file sharing environment assumed to set a reference value of the management difficulty. In FIG. 42, a management difficulty is calculated as follows, with reference to the described calculation example of a management difficulty in relation to FIG. 27.

The calculation example in the configuration in FIG. 27

<Network> management difficulty=1*1+2*1+3*1=6

<File Sharing> management difficulty=1*1+2*1=3

<File System> management difficulty=1*1=1

<Backup> management difficulty=1*1+2*1+3*1=6

<Logical Volume> management difficulty=1*1+2*1+3*1=6

<Path Setting> management difficulty=1*1+2*1=3 total management difficulty=6+3+1+6+6+3=25

The reference value of the usage degree: it is assumed that the access frequency=100, the number of files=10, and the number of users=5, and the usage degree is set as 100*10*5=5000.

The data manager 530 defines an action to be applied to the file sharing environment by comparing the average maintenance interval, the management difficulty, and the usage degree of the file sharing environment that are acquired in S2301 to S2303 to the above-mentioned conditional expression, and creates the priority management object list exemplified in FIG. 41 (S2304). The priority management object list is referred as described in relation to FIG. 21 when the GUI manager 540 in the management server 500 performs the predetermined action on the file sharing environment.

Referring back to the processing flow by the data manager 530 shown in FIG. 23, subsequently the data manager 530 acquires, with respect to the file sharing environment recorded in the priority management object list in S2304 in association with the action, the recorded contents of the environment management table 1200 (FIG. 12), the link aggregation management table 1300 (FIG. 13), the file sharing management table 1400 (FIG. 14), the file system management table 1500 (FIG. 15), the backup management table 1600 (FIG. 16), the logical volume management table 1700 (FIG. 17), and the FC path management table 1800 (FIG. 18) that are stored in the management table storing area 170 in the virtual NASs 100A and 100B that provide the file sharing environment, and updates the record related to the corresponding file sharing environment that is recorded in the cache DB 560 in the management server 500 on the basis of the recorded contents (S2305). FIG. 35 shows an overview of a data flow in the system 1 when the data manager 530 updates the cache DB 560.

Next, the data manager 530 in the management server 500 refers to the priority management object list 571, and determines whether there is a file sharing environment having its associated action for which "movement of the virtual NAS" is set (S2306). If determining that there is no file sharing environment that is associated with the action including the "movement of the virtual NAS" (S2306: No), the data manager 530 terminates the processing without doing anything.

If determining that there is a file sharing environment that is associated with the action including the "movement of the virtual NAS" (S2306: Yes), the data manager 530 calculates an average and a variance of the management difficulty of each physical NAS 100 to which the virtual NASs 100A and 100B belong, from the acquired management difficulty of the virtual NASs 100A and 100B that each provide the file sharing environment (S2307). FIG. 37 shows an overview of a data flow in the system 1 when the data manager 530 executes the moving processing of the virtual NASs 100A and 100B.

In the configuration in which only the file sharing environments each having the higher management difficulty are intensively operated in the physical NAS 100, when a failure occurs in the physical NAS 100 to which the virtual NASs 100A and 100B belong, the recovery of any of the virtual NASs 100A and 100B might be delayed due to the higher management difficulty. Therefore, the data manager 530 successively obtains an average value and a variance of the management difficulty of each of the physical NAS 100 to which the virtual NASs 100A and 100B belong, and selects the physical NAS 100 with the highest average value and the smallest variance as an object of migration (S2308).

FIG. 37 schematically shows the moving processing of the virtual NASs 100A and 100B. In the system configuration exemplified in FIG. 37, an NAS1 and an NAS2 that are physical NASs 100 are included. The management difficulties of the virtual NASs 100A and 100B that provide two file sharing environments "env-1" and "env-2" operating in the NAS1 are 50 and 60, respectively, and the management difficulties of the virtual NASs 100A and 100B that provide two file sharing environments "env-3" and "env-4" operating in the NAS2 are 130 and 132, respectively. In this case, an average value and a variance, which are described above, of each of the NAS1 and the NAS2 are calculated as follows.

Management Difficulty in NAS1 (Physical NAS)

average value=(50+60)/2=55 variance=((50-55)^2+(60-55)^2)/2=25

Management Difficulty in NAS2 average value=(130+132)/2=131 variance=((130-131)^2+(132-131)^2)/2=1

Therefore, in the example shown in FIG. 37, the virtual NASs 100A and 100B that belong to the NAS2, out of the NAS1 and the NAS2, with the higher average and the smaller variance of the management difficulty becomes a candidate of a virtual NAS to be migrated to another physical NAS.

Next, as a physical NAS 100 to be a migration destination of the virtual NASs 100A and 100B, the data manager 530 selects a physical NAS with the smaller average value and the smaller variance value of the management difficulty related to the file sharing environment of the virtual NASs 100A and 100B that belong to the physical NAS (for example, a physical NAS in which a virtual NAS is not constructed and both of the average value and the variance value are "0" (S2309).

Next, the data manager 530 executes the processing that determines whether the system configuration of the virtual NASs 100A and 100B that are selected each as an object of migration (the virtual NAS that provides the file sharing environment "env-4" in the example shown in FIG. 37) can be changed in order to reduce the management difficulty in the physical NAS 100 that is a migration destination (NAS3 in the example shown in FIG. 37) (S2310).

FIG. 43 shows an example of a processing flow for determining whether the management difficulty can be reduced by simplifying the system configurations of the virtual NASs 100A and 100B that are identified as objects of migration. The virtual NASs 100A and 100B to be the objects of migration are not moved to another physical NAS 100 without doing anything, but are moved with the reduced management difficulty by simplifying the configurations thereof. This further increases the stability on the operation of the system. The data manager 530 in the management server 500 executes the processing flow shown in FIG. 43 from such the view point.

Firstly, the data manager 530 selects one from the virtual NASs 100A and 100B that are selected as objects of migration (S4301). The data manager 530 refers to the link aggregation management table 1300 recorded in the cache DB 560 of the file sharing environment provided by the corresponding virtual NAS, and determines whether the simplification of the network configuration is possible (S4302). The data manager 530 determines that the simplification of the network configuration is possible if two or more physical devices are allocated to the virtual NASs 100A and 100B and the number of accesses is determined to be smaller than the reference value, for example (S4302: Yes). In this case, the data manager 530 reduces the management difficulty by reducing the number of the above-mentioned physical devices (S4303). If determining that the simplification of the network configuration is not possible (S4302: No), the data manager 530 progresses to the processing of S4304.

Next, the data manager 530 refers to the file sharing management table 1400 recorded in the cache DB 560 of the file sharing environment provided by the corresponding virtual NAS, and determines whether the simplification of the file sharing configuration is possible (S4304). The data manager 530 determines that the simplification of the file sharing configuration is possible if there is a user who does not access the file system for a certain period among the users who are registered in the file sharing environment, for example (S4304: Yes). In this case, the data manager 530 reduces the management difficulty by deleting the ACL and the ACE corresponding to the user (S4305). If determining that the simplification of the file sharing configuration is not possible (S4304: No), the data manager 530 progresses to the processing of S4306.

Next, the data manager 530 refers to the file system management table 1500 recorded in the cache DB 560 of the file sharing environment provided by the corresponding virtual NAS, and determines whether the simplification of the file system configuration is possible (S4306). The data manager 530 determines that the simplification of the file sharing configuration is possible if there is a user who does not access the file system for a certain period among the users who are registered in the file sharing environment, for example (S4306: Yes). In this case, the data manager 530 reduces the management difficulty by deleting the quota information corresponding to the user (S4307). If determining that the simplification of the file system configuration is not possible (S4306: No), the data manager 530 progresses to the processing of S4308.

Next, the data manager 530 refers to the backup management table 1600 recorded in the cache DB 560 of the file sharing environment provided by the corresponding virtual NAS, and determines whether the simplification of the backup configuration is possible (S4308). The data manager 530 determines that the simplification of the backup configuration is possible if a plurality of backup methods are set for the file sharing environment and the usage degree is smaller than the reference value, for example (S4308: Yes). In this case, the data manager 530 reduces the management difficulty by deleting any of the backup methods (S4309). If determining that the simplification of the backup configuration is not possible (S4308: No), the data manager 530 progresses to the processing of S4310.

Next, the data manager 530 refers to the logical volume management table 1700 recorded in the cache DB 560 of the file sharing environment provided by the corresponding virtual NAS, and determines whether the simplification of the logical volume configuration is possible (S4310). The data manager 530 determines that the simplification of the logical volume configuration is possible if a thin-provisioning function is supported in the storage apparatus 200 (disk subsystem) to which the virtual NASs 100A and 100B are coupled, for example (S4310: Yes). In this case, the data manager 530 reduces the management difficulty by creating a file system on the LU created and allocated by the thin-provisioning function and by migrating the data thereon (S4311). If determining that the simplification of the logical volume configuration is not possible (S4310: No), the data manager 530 progresses to the processing of S4312.

Next, the data manager 530 refers to the FC path management table 1800 recorded in the cache DB 560 of the file sharing environment provided by the corresponding virtual NAS, and determines whether the simplification of the FC path configuration is possible (S4312). The data manager 530 determines that the simplification of the FC path configuration is possible if a plurality of FC paths are allocated to the virtual NASs 100A and 100B and the number of accesses is smaller than the reference value, for example (S4312: Yes). In this case, the data manager 530 reduces the management difficulty by reducing the number of FC paths (S4311). If determining that the simplification of the FC path configuration is not possible (S4312: No), the data manager 530 progresses to the processing of S4314.

After the simplification processing related to the system configurations described above, the data manager 530 makes the physical NAS 100 that is a migration destination execute setting of an environment compatible with the simplified configurations, and constructs new virtual NASs 100A and 100B and a file sharing environment provided thereby (S4314). The virtual NASs 100A and 100B are constructed specifically by utilizing the function of virtualization software mounted on the physical NAS 100 of the migration destination.

Next, the data manager 530 determines whether the simplification determination processing and the migration processing are completed for all the selected the virtual NASs 100A and 100B to be migrated (S4315). If determining that the simplification determination processing and the migration processing are completed (S4315: Yes), the data manager 530 terminates the processing. If determining that the simplification processing and the migration processing are not completed (S4315: No), the data manager 530 makes the processing back to S4301.

With the configuration described above, the virtual NASs 100A and 100B with the higher management difficulty can be moved from a physical NAS 100 in which a plurality of virtual NASs 100A and 100B each providing a file sharing environment with the higher management difficulty operates to another physical NAS 100 with a light load. Accordingly, the load of each of the physical NASs 100 can be leveled, and a quick recovery can be expected even if a failure occurs in the physical NAS 100.

Furthermore, when virtual NASs are migrated, the configuration of a file sharing environment provided by the virtual NASs 100A and 100B can be simplified in accordance with the predetermined conditions. This makes it possible to reduce the management difficulty of a file sharing environment provided by the migrated virtual NASs 100A and 100B, and to achieve the more appropriate management of the file sharing environment.

Consequently, with the management system and the management method for a storage system according to the embodiment of the present invention, in the storage system having a plurality of file sharing environments, the difficulty related to management can be identified for every file sharing environment, and an appropriate management can be executed based on the management difficulty.

As described above, the invention of the present application has been described with reference to the accompanying drawings. The invention of the present application is not limited to the embodiments. Any modifications and equivalents without deviating from the spirit of the invention of the present application are within the invention of the present application.

The invention claimed is:

1. A management system for a storage system, the storage system including
   a computer that executes data processing;
   a storage apparatus that provides a storage area for data processed in the computer;
   a plurality of file systems each of which enables the computer to input and output data from and to the storage apparatus per file unit;
   a storage control device in which a plurality of file sharing environments that enable a plurality of users to access a plurality of files managed by the file systems from the computer are constructed;
   a first communication network that communicably couples the computer to the storage control device; and
   a second communication network that communicably couples the storage apparatus to the storage control device,
   the management system comprising:
   an average maintenance interval calculating part to calculate an average maintenance interval that is an average value of time intervals at which an operation command is given to each of the file sharing environments;
   a management difficulty calculating part, for each of the file sharing environments, to calculate a management difficulty that is an index quantitatively showing a difficulty to manage the file sharing environment and is determined based on a type and a quantity of resources included in the file sharing environment;
   a file sharing environment usage degree calculating part to calculate a file sharing environment usage degree that is an index showing a degree of usage of each of the file sharing environments and is determined based on an access frequency that is an index showing a frequency at which the users access the file sharing environment and the number of users who access the file sharing environment;
   a processing content keeping part that keeps numerical ranges and processing contents in association with each other, the numerical ranges being defined in advance respectively for the average maintenance interval, the management difficulty, and the file sharing environment usage degree, the processing contents being defined respectively for the average maintenance interval calculating part, the management difficulty calculating part, and the file sharing environment usage degree calculating part, in association with the numerical ranges;
   a management object storing area that keeps each of the file sharing environments and the processing content in association with each other, the processing content kept in the processing content keeping part; and
   a processing content executing part that executes the processing contents kept in the processing content keeping part in association with each of the file sharing environments;
   wherein when the management difficulties calculated for the respective file sharing environments are compared to one another and a determination is made that there are the plurality of file sharing environments each having the management difficulty higher than a predetermined condition in a specific storage control device, any one selected from the file sharing environments having higher management difficulty is moved to another different storage control device.

2. The management system for the storage system according to claim 1, wherein:
- when the management difficulties calculated for the respective file sharing environments are compared to one another and a determination is made that there are the plurality of file sharing environments each having the management difficulty higher than a predetermined condition in a specific storage control device, any one selected from the file sharing environments having higher management difficulty is moved to another different storage control device;
- the file sharing environment to be moved to the different storage control device is a file sharing environment determined to have a highest average value of the management difficulty and a smallest variance from the average value, where the average value and the variance are calculated, for each of the file sharing environments operating in the specific storage control device, on the basis of the management difficulty of the file sharing environment;
- the management difficulty is a total sum of management difficulty calculated, for at least one of configurations of each file sharing environment, on the basis of the number of tiers of resources forming the configuration and a redundancy in the tiers, the configurations including a configuration of the first communication network, a file sharing configuration, a file system configuration, a backup configuration, a logical storage area configuration, and a configuration of the second communication network;
- weighting processing is performed on the management difficulty calculated for each of the configurations, the weighting processing increasing the management difficulty as the hierarchy runs deeper from the first communication network configuration, the file sharing configuration, the file system configuration, the backup configuration, the logical storage area configuration, to the second communication network configuration, in this order, seen from a user who accesses the storage control device;
- the average maintenance interval calculating part refers to an access record from the computer to each of the file sharing environments, and calculates an average value of time intervals of accesses from the computer during a predetermined period to the file sharing environment as an average maintenance interval; and
- the file sharing environment usage degree calculating part calculates the file sharing environment usage degree of each of the file sharing environments as a product of the number of accesses per predetermined unit time, the number of files accessed from the computer, and the number of users who access this file sharing environment.

3. The management system for a storage system according to claim 2, wherein the file sharing environment to be moved to the different storage control device is a file sharing environment determined to have a highest average value of the management difficulty and a smallest variance from the average value, where the average value and the variance are calculated, for each of the file sharing environments operating in the specific storage control device, on the basis of the management difficulty of the file sharing environment.

4. The management system for the storage system according to claim 1, wherein the management difficulty is a total sum of management difficulty calculated, for at least one of configurations of each file sharing environment, on the basis of the number of tiers of resources forming the configuration and a redundancy in the tiers, the configurations including a configuration of the first communication network, a file sharing configuration, a file system configuration, a backup configuration, a logical storage area configuration, and a configuration of the second communication network.

5. The management system for the storage system according to claim 4, wherein weighting processing is performed on the management difficulty calculated for each of the configurations, the weighting processing increasing the management difficulty as the hierarchy runs deeper from the first communication network configuration, the file sharing configuration, the file system configuration, the backup configuration, the logical storage area configuration, to the second communication network configuration, in this order, seen from the computer who accesses the storage control device.

6. The management system for the storage system according to claim 1, wherein the average maintenance interval calculating part refers to an access record from the computer to each of the file sharing environments, and calculates an average value of time intervals of accesses from the computer during a predetermined period to the file sharing environment as an average maintenance interval.

7. The management system for the storage system according to claim 1, wherein the file sharing environment usage degree calculating part calculates the file sharing environment usage degree of each of the file sharing environments as a product of the number of accesses per predetermined unit time, the number of files accessed from the computer, and the number of users who access this file sharing environment.

8. A management method for a storage system, the storage system including
- a computer that executes data processing;
- a storage apparatus that provides a storage area of the data processed in the computer;
- a plurality of file systems that enable the computer to input and output data from and to the storage apparatus per file unit;
- a storage control device in which a plurality of file sharing environments that enable a plurality of users to access a plurality of files managed by the file systems from the computer are constructed;
- a first communication network that communicably couples the computer to the storage control device; and
- a second communication network that communicably couples the storage apparatus to the storage control device, the method comprising:
providing the storage system with:
- an average maintenance interval calculating part to calculate an average maintenance interval that is an average value of time intervals of an operation command given to each of the file sharing environments, a management difficulty calculating part, with respect to each of the file sharing environments, to calculate a management difficulty that is an index quantitatively showing a difficulty to manage the file sharing environment and is determined based on a type and a quantity of resources included in the file sharing environment, and a file sharing environment usage degree calculating part to calculate a file sharing environment usage degree that is an index showing a degree of usage of this file sharing environment and is determined based on an access frequency that is an index showing a frequency at which the users access each of the file sharing environments and the number of users who access the file sharing environment;

keeping numerical ranges and processing contents in association with each other, the numerical ranges being defined in advance respectively for the average maintenance interval, the management difficulty, and the file sharing environment usage degree, the processing contents being defined respectively for the average maintenance interval calculating part, the management difficulty calculating part, and the file sharing environment usage degree calculating part, in association with the numerical ranges;

keeping each of the file sharing environments and the processing content in association with each other, the processing content kept in the processing content keeping part; and executing the processing contents kept in the processing content keeping part in association with each of the file sharing environments;

wherein when the management difficulties calculated for the respective file sharing environments are compared to one another and a determination is made that there are the plurality of file sharing environments each having the management difficulty higher than a predetermined condition in a specific storage control device, any one selected from the file sharing environments having higher management difficulty is moved to another different storage control device.

9. The management method for the storage system according to claim 8, wherein the file sharing environment to be moved to the different storage control device is a file sharing environment determined to have a highest average value of the management difficulty and a smallest variance from the average value, where the average value and the variance are calculated, for each of the file sharing environments operating in the specific storage control device, on the basis of the management difficulty of the file sharing environment.

10. The management method for the storage system according to claim 8, wherein the management difficulty is a total sum of management difficulty calculated, for at least one of configurations of each file sharing environment, on the basis of the number of tiers of resources forming the configuration and a redundancy in the tiers, the configurations including a configuration of the first communication network, a file sharing configuration, a file system configuration, a backup configuration, a logical storage area configuration, and a configuration of the second communication network.

11. The management method for the storage system according to claim 10, wherein weighting processing is performed on the management difficulty calculated for each of the configurations, the weighting processing increasing the management difficulty as the hierarchy runs deeper from the first communication network configuration, the file sharing configuration, the file system configuration, the backup configuration, the logical storage area configuration, to the second communication network configuration, in this order, seen from the computer who accesses the storage control device.

12. The management method for the storage system according to claim 8, wherein the average maintenance interval calculating part refers to an access record from the computer to each of the file sharing environments, and calculates an average value of time intervals of accesses from the computer during a predetermined period to the file sharing environment as an average maintenance interval.

13. The management method for the storage system according to claim 8, wherein the file sharing environment usage degree calculating part calculates the file sharing environment usage degree of each of the file sharing environments as a product of the number of accesses per predetermined unit time, the number of files accessed from the computer, and the number of users who access this file sharing environment.

* * * * *